United States Patent [19]

Kurabayashi et al.

[11] Patent Number: 4,965,591
[45] Date of Patent: Oct. 23, 1990

[54] RECORDING WITH POLYMER LIQUID CRYSTAL RECORDING MEDIUM

[75] Inventors: Yutaka Kurabayashi, Yokohama; Toshikazu Ohnishi, Atsugi; Kazuo Yoshinaga, Machida; Akihiro Mouri, Atsugi; Kazuo Isaka, Tokyo; Shuzo Kaneko, Yokohama; Takeo Eguchi, Atsugi; Yomishi Toshida, Yokohama, all of Japan

[73] Assignee: Canon Kabushiki Kaisha, Tokyo, Japan

[21] Appl. No.: 241,214

[22] Filed: Sep. 7, 1988

[30] Foreign Application Priority Data

| Sep. 8, 1987 | [JP] | Japan | 62-223147 |
| Dec. 10, 1987 | [JP] | Japan | 62-310848 |
| Dec. 18, 1987 | [JP] | Japan | 62-318929 |
| Dec. 29, 1987 | [JP] | Japan | 62-336128 |
| Jan. 25, 1988 | [JP] | Japan | 63-012639 |

[51] Int. Cl.$^5$ .................................. G01D 15/16
[52] U.S. Cl. .................. 346/108; 346/135.1; 350/330
[58] Field of Search .......... 346/108, 107 R, 135.1, 346/76 L, 1.1; 350/330

[56] References Cited

U.S. PATENT DOCUMENTS 4,702,945 10/1987 Etzbach et al. ............... 350/330
4,810,868 3/1989 Drexler ........................ 346/76 L

FOREIGN PATENT DOCUMENTS 0171045 2/1986 European Pat. Off. .
0231856 8/1987 European Pat. Off. .
0231857 8/1987 European Pat. Off. .
0231858 8/1987 European Pat. Off. .

*Primary Examiner*—Mark J. Reinhart
*Attorney, Agent, or Firm*—Fitzpatrick, Cella, Harper & Scinto

[57] ABSTRACT

A recording medium having a recording layer comprising a polymer liquid crystal is used for multivalue recording by using at least two different liquid crystal phases at least two levels of locally different liquid crystal proportion, or thicknesswise difference in an optical variable, such as transmittance a reflectance, generally through controlled heating and cooling. In effecting the recording, two heating sources may suitably be used, one for imagewise heating and the other for supplemental heating.

10 Claims, 9 Drawing Sheets

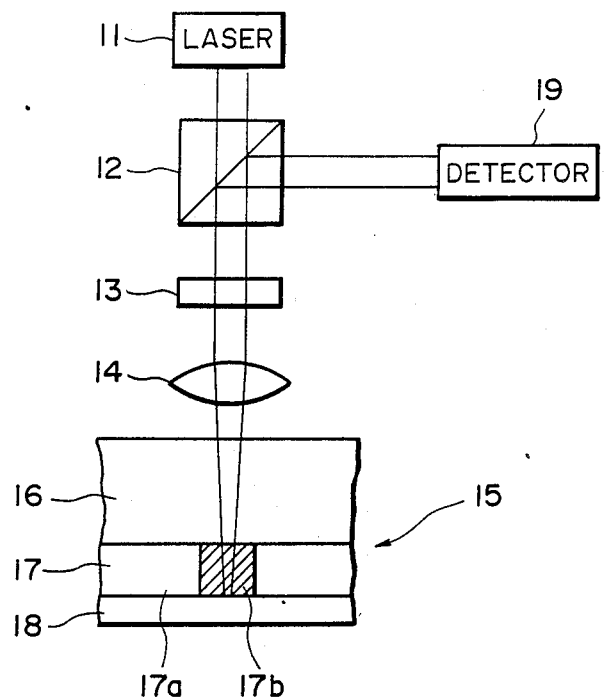
F I G. 1

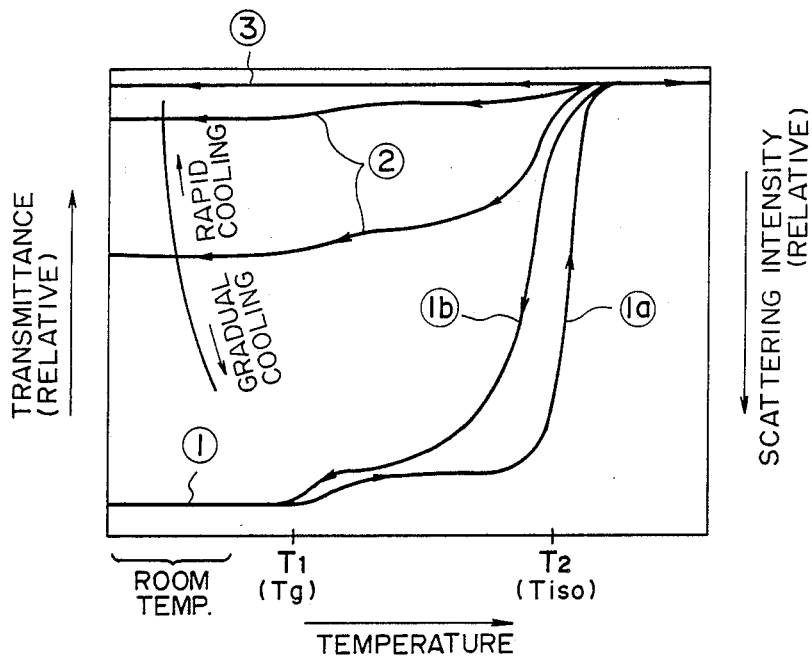
FIG. 5
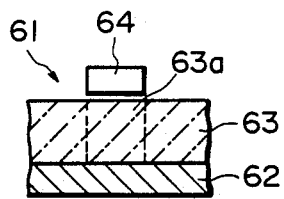 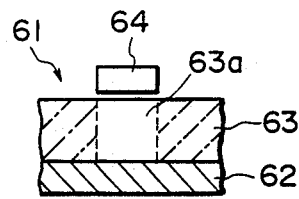 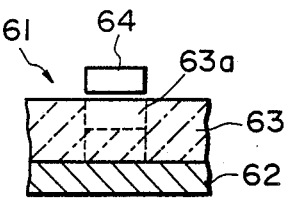
FIG. 6A    FIG. 6C    FIG. 6E
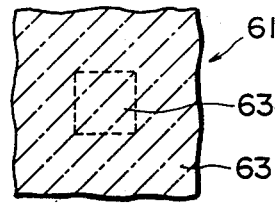 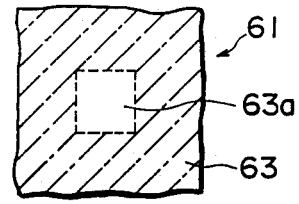 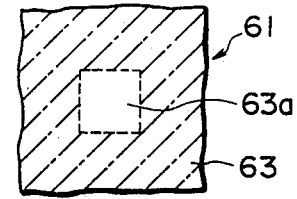
FIG. 6B    FIG. 6D    FIG. 6F

RECORDING WITH POLYMER LIQUID CRYSTAL RECORDING MEDIUM

FIELD OF THE INVENTION AND RELATED ART

The present invention relates to a recording apparatus suitable for an erasable and rewritable recording medium, and also to a method of continuous multi-value recording in a recording system using the recording medium.

Hitherto, there have been known recording and display media, which are susceptible of thermally reversible erasure and repetitive use, composed of a polymer or a mixture of a polymer and a low-molecular weight compound inclusive of, e.g., a polymer liquid crystal and phase separation polymer. Such a polymeric recording medium generally has a point of reversible transition, such as phase transition point, phase separation point, etc., at a high temperature, so that it involves a problem that a large application energy is required at the time of recording. Further, as the medium is instantaneously heated to a high temperature, there arises a problem of polymer degradation. On the other hand, there is a desire for a method of effectively controlling optical variable, such as optical transmittance or reflectance, of such a recording medium comprising a polymeric recording layer.

Now, rewritable recording systems are generally explained in some detail.

Known rewritable recording systems include: those utilizing inorganic materials, such as the optomagnetic system utilizing a magneto-optical characteristic of a magnetic material, the phase transition system utilizing a reversible phase transition between the amorphous and crystal phases of a chalcogenide film and a system utilizing a structural change in an amorphous phase temperature region. Further, known systems utilizing organic materials include the recording system of the photon mode with a photochromic material and the system utilizing a change in optical reflectance between the uniform alignment state and the non-alignment state of a polymer liquid crystal.

In recent years, a data recording system capable of high-density recording is desired. One system capable of increasing a recording density may be a multi-value data recording system wherein a recording spot is provided with multiple states. As examples of the multi-value data recording system, there have been proposed systems wherein the reflectance of a cholesteric polymer liquid crystal is changed at multiple levels by changing the helical pitch or formation of pits in the non-aligned state (Japanese Laid-Open Patent Applications JP-A (Kokai) Sho. Nos. 62-107448 and 62-12937).

The above-mentioned rewritable recording systems respectively involve some problems or have left some room for improvement. For example, in the optomagnetic recording system wherein a recording state is read out by detecting the rotation of a polarization plane due to the Kerr effect or Farady effect accompanying spin inversion. The rotation angle is as small as 1 degree or less, so that it is difficult to realize multi-value recording with a broad dynamic range. In the phase transition recording system, the phase transition temperature range for selecting the amorphous state and the liquid crystal state is narrow so that it is difficult to effect multi-value recording by a temperature change.

Further, as examples of the multi-value recording system using a polymer liquid crystal, JP-A No. (Kokai) 62-107448 discloses a method of controlling the helical pitch or the inclination or orientation of a cholesteric polymer liquid crystal depending on the density of irradiating energy. Further, JP-A (Kokai) No. 62-12937 discloses a method of applying an electric or magnetic field in addition to irradiation energy while controlling the direction of the field of effect multi-value recording.

However, the above-proposed multi-value recording systems still involve problems, such that a sufficient dynamic range cannot be attained, the writing apparatus for multi-value recording is complicated, and a linear relationship is not attained at the time of multi-value recording between the irradiation energy or the intensity or anisotropy of the electric or magnetic field and the readout light quantity.

SUMMARY OF THE INVENTION

In view of the above problems, an object the present invention is to provide a recording system for recording on a recording medium having a polymer recording layer, whereby recording is effected at a low energy and the durability of the polymer is increased.

Another object of the present invention is to provide a system for recording on a polymer recording layer, whereby multi-value recording can be effected at high contrast and also a high reproduction S/N ratio can be attained.

According to an aspect of the present invention, there is provided a recording apparatus including a recording medium comprising a polymeric recording layer which provides a transparent state or an opaque state when heated or held at a prescribed temperature; and first heating means and second heating means for heating the recording layer to control the transparent and opaque states of the recording layer; wherein either one of the first and second heating means is a selective heating means for recording data and the other is a supplemented heating means for heating the recording layer to the neighborhood of a reversible transition temperature such as a phase transition temperature of a polymer or a mixture of a polymer and a low-molecular weight material constituting the polymeric recording layer.

According to another aspect of the present invention, there is provided a recording method wherein the optical change in the thickness direction of a polymeric recording layer is controlled by heating-control means to effect multi-value recording.

According to still another aspect of the present invention, there are provided effective methods for multi-value recording applicable to a recording layer comprising a polymer liquid crystal.

According to an embodiment of this aspect, there is provided a recording method which comprises providing an optical recording medium having a recording layer comprising a polymer liquid crystal which has at least two different liquid crystal phases, applying at least two levels of energy to the recording layer in a controlled manner thereby to heat the polymer liquid crystal selectively into a specific liquid crystal phase or isotropic phase, and then rapidly, cooling the recording layer to record multi-value data.

According to another embodiment of this aspect, there is provided a recording method wherein the liquid crystal proportion of a polymer liquid crystal is locally controlled to form a record portion, thereby to effect multi-value recording by utilizing a difference in liquid crystal proportion between the record portion and a non-record portion. Herein the liquid crystal proportion refers to the areal percentage of an orderly liquid crystal portion in a polymer liquid crystal matrix when observed through an optical microscope at a magnification of, e.g., about 50.

These and other objects, features and advantages of the present invention will become more apparent upon a consideration of the following description of the preferred embodiments of the present invention taken in conjunction with the accompanying drawings wherein like parts are denoted by like reference numerals.

BRIEF DESCRIPTION OF THE DRAWINGS

FIG. 1 is an illustration of a writing and readout apparatus using a semiconductor laser for effecting the recording method of the present invention;

FIG. 5 is a view for illustrating a principle of recording with a polymer liquid crystal;

FIGS. 6A, 6C and 6E are schematic sectional views and FIGS. 6B, 6D and 6F are schematic plan views, respectively, for illustrating principle of multi-value recording according to the present invention;

DESCRIPTION OF THE PREFERRED EMBODIMENTS

Figure 2:
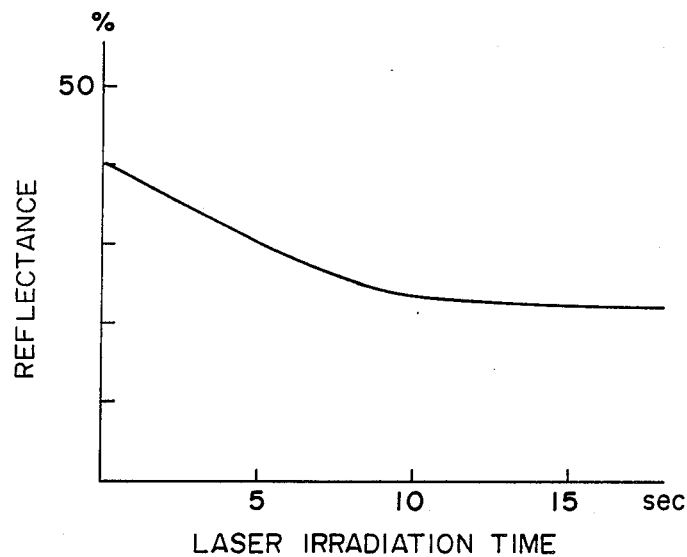
FIG. 2 is a graph showing a relationship between the reflectance and the laser beam irradiation time.

The recording layer of a recording medium used in the present invention may suitably comprise a thermotropic polymer liquid crystal. Examples thereof may include a side chain-type polymer liquid crystal which comprise a main chain of a methacrylic acid polymer, a siloxane polymer, etc., and a mesogen or low-molecular weight liquid crystal unit in side chains thereof like pendants; and also a main chain-type comprising a mesogen unit in its main chain, such as those of the polyester-type or polyamide-type, as used in the field of high-strength and high-modulus, heat-resistant fiber or resin.

These polymer liquid crystal may assume smectic phase, nematic phase, cholesteric phase or another phase or can also be a discotic liquid crystal.

Another class of polymer liquid crystals suitably used in the present invention may include a polymer liquid crystal showing ferroelectricity by introducing an asymmetric carbon atom to assume SmC* (chiral smectic C) phase.

Specific examples of the polymer liquid crystal used in the present invention are enumerated hereinbelow while other polymer liquid crystals can also be used in the present invention.

(In the following formulas (1)–(13), p=5–1000, $1 \leq n_1 < 15$).

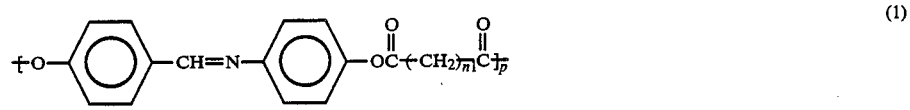
(1)

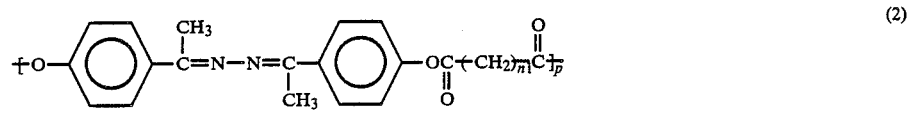
(2)

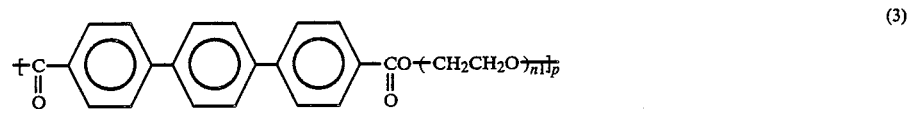
(3)

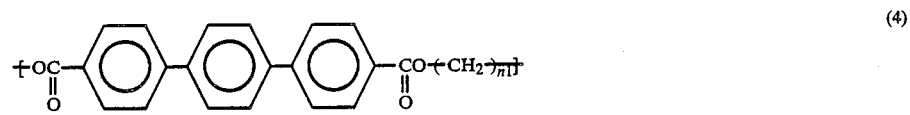
(4)

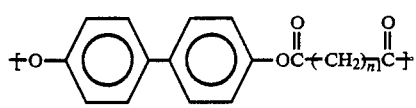 (5)
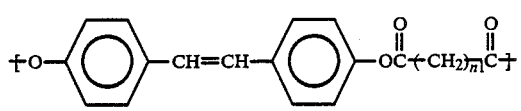 (6)
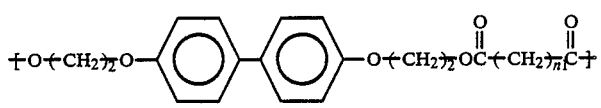 (7)
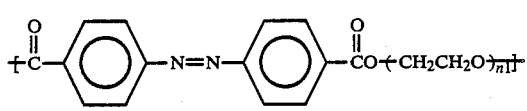 (8)
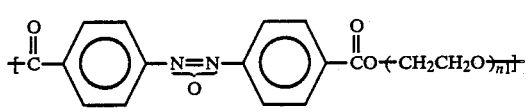 (9)
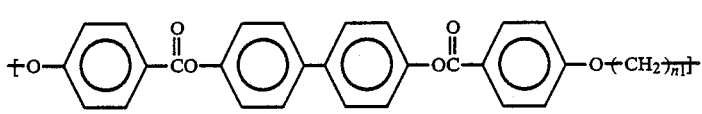 (10)
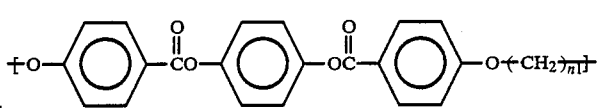 (11)
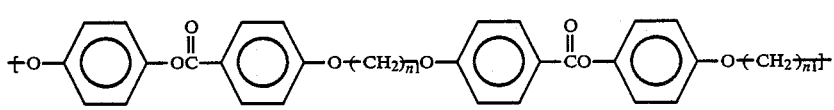 (12)
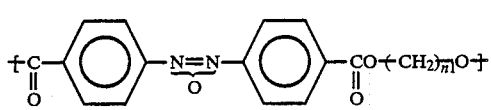 (13)
(In the following formulas (14)-(17), p=5-1000, p1+p2=5-1000, q=1-16, q1=1-16 and q2=1-16.)
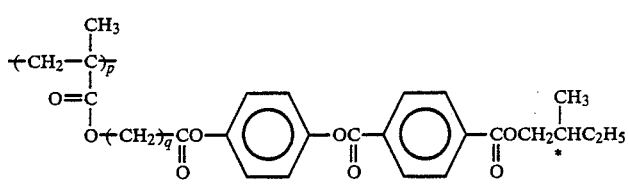 (14)
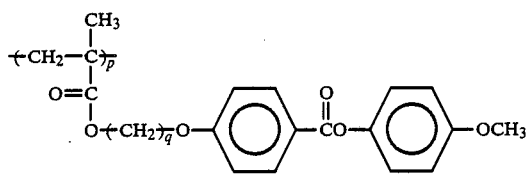 (15)

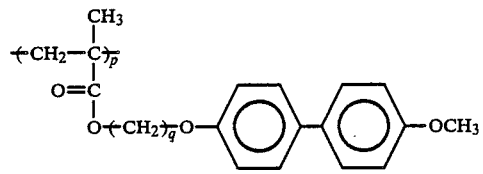
(16)
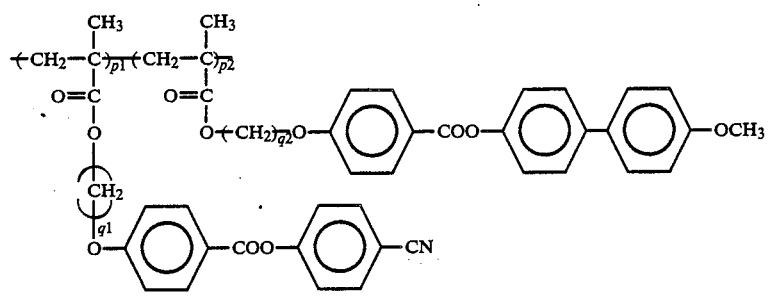
(17)
(In the following formulas (18)–(62), * denotes the location of an asymmetric carbon atom, and $n2 = 5-1000$.)
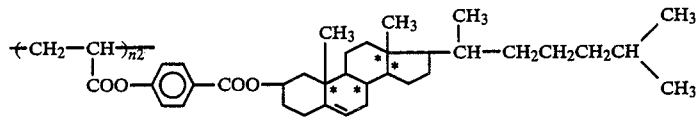
(18)
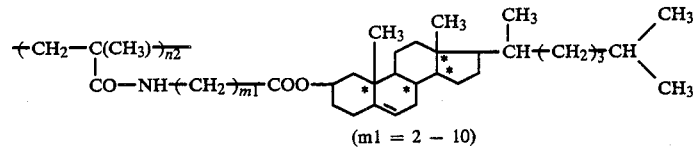
(19)
$(m1 = 2 - 10)$
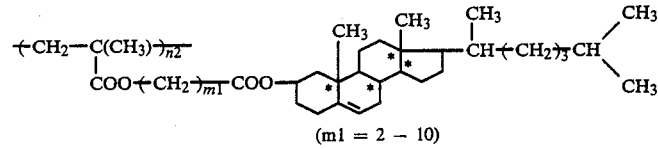
(20)
$(m1 = 2 - 10)$
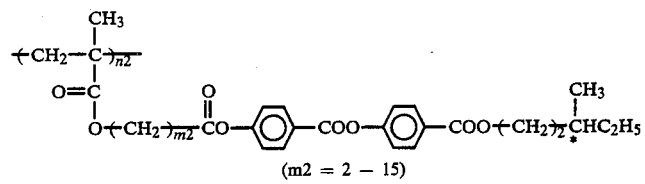
(21)
$(m2 = 2 - 15)$
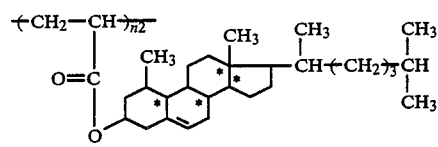
(22)
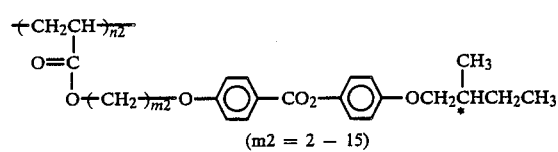
(23)
$(m2 = 2 - 15)$

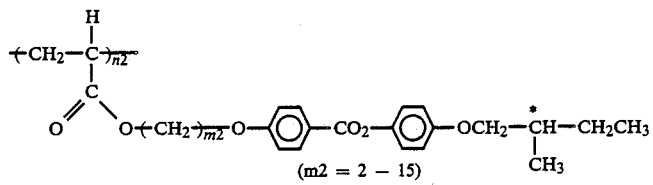
(24)
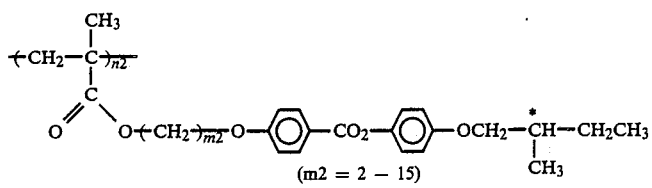
(25)
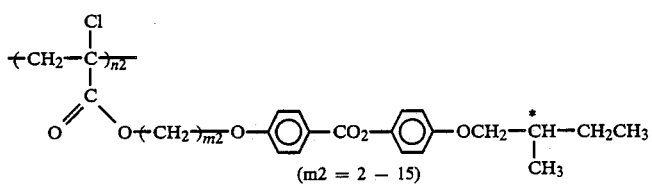
(26)
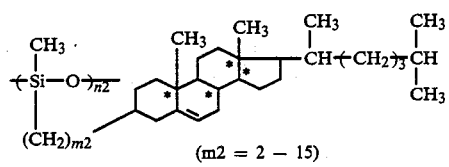
(27)
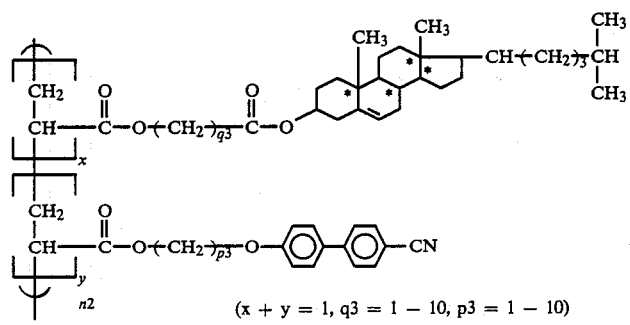
(28)
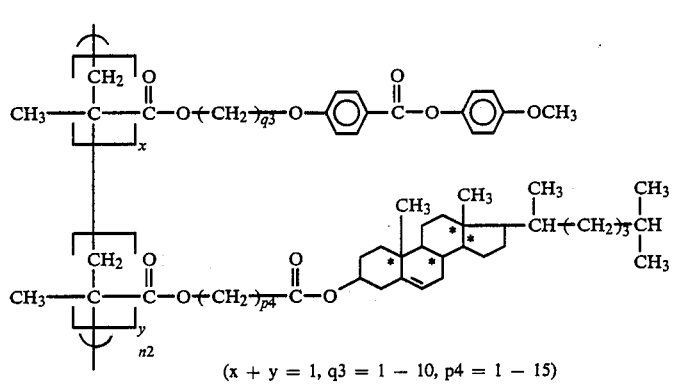
(29)
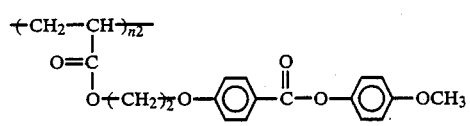
(30)

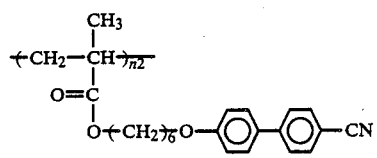
(31)
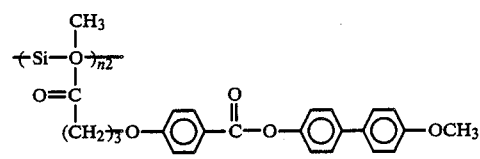
(32)
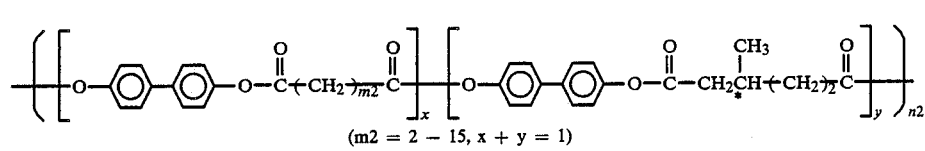
(33)
(m2 = 2 − 15, x + y = 1)
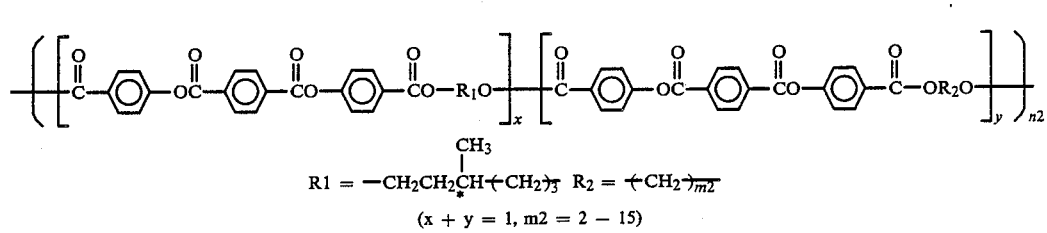
(34)
R1 = —CH2CH2CH*(CH3)(CH2)3  R2 = (CH2)m2
(x + y = 1, m2 = 2 − 15)
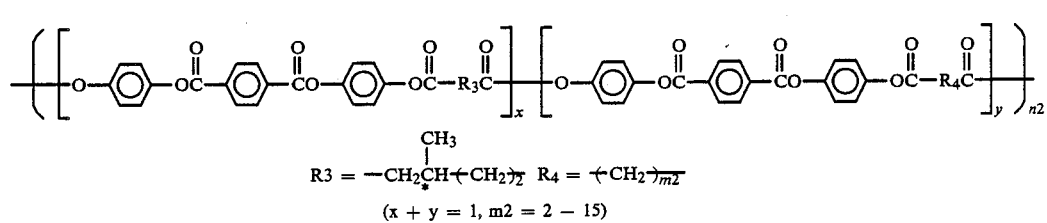
(35)
R3 = —CH2CH*(CH3)(CH2)2  R4 = (CH2)m2
(x + y = 1, m2 = 2 − 15)
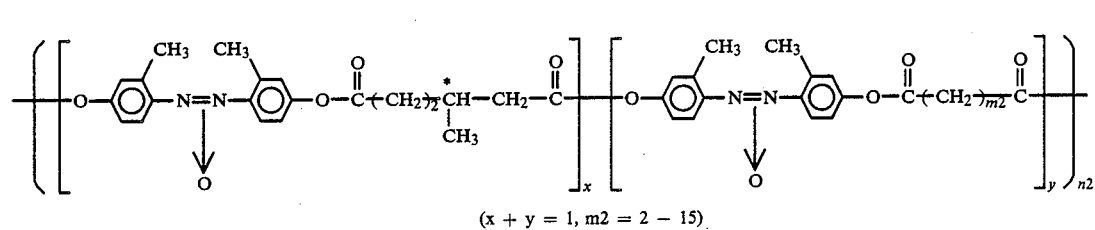
(36)
(x + y = 1, m2 = 2 − 15)
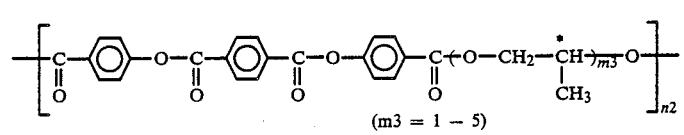
(37)
(m3 = 1 − 5)
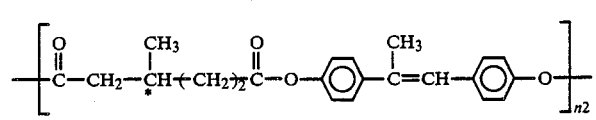
(38)

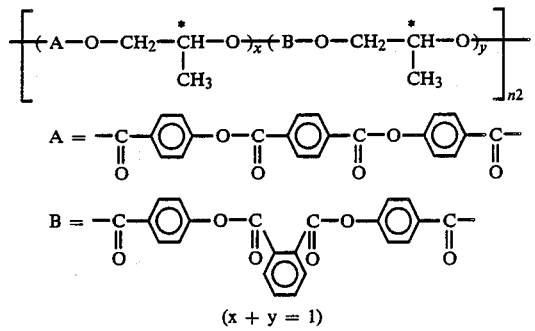
(39)
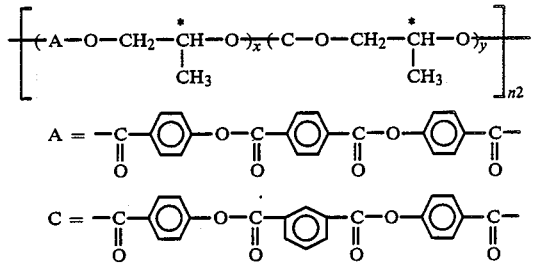
(40)
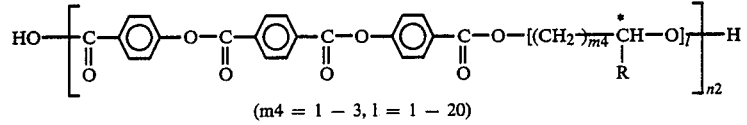
(41)
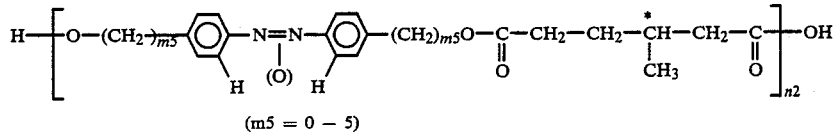
(42)
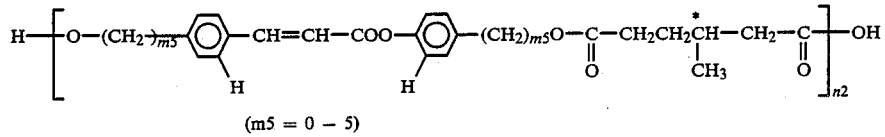
(43)
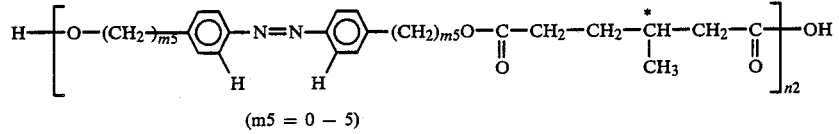
(44)
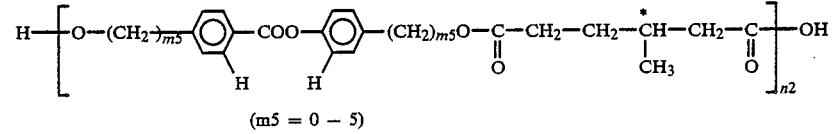
(45)
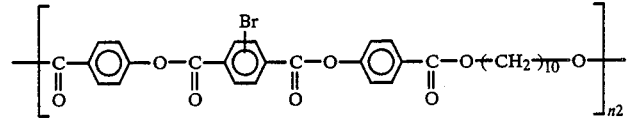
(46)
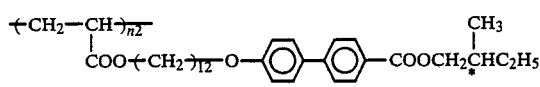
(47)

-continued
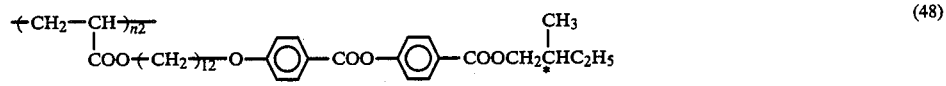 (48)
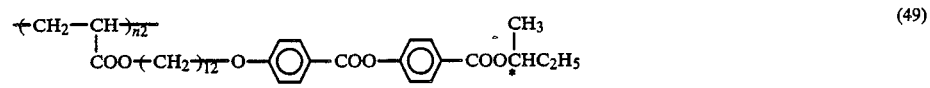 (49)
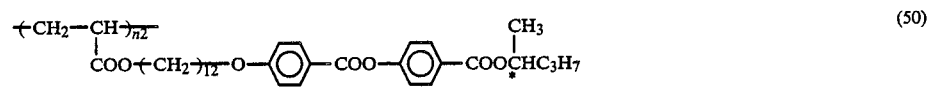 (50)
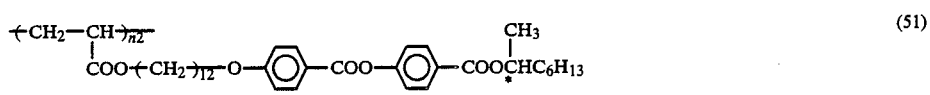 (51)
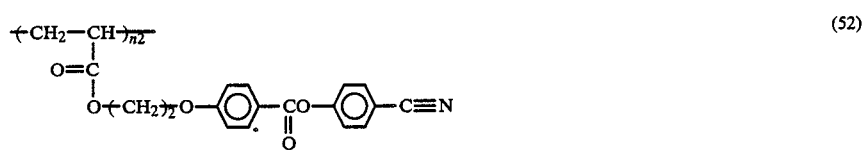 (52)
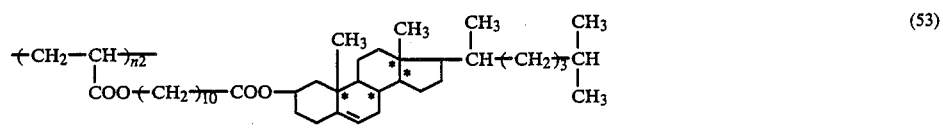 (53)
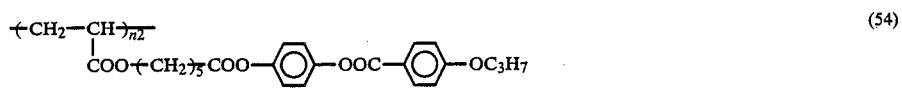 (54)
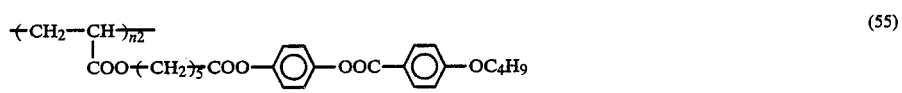 (55)
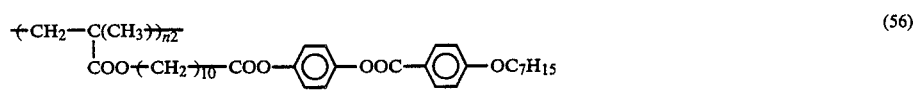 (56)
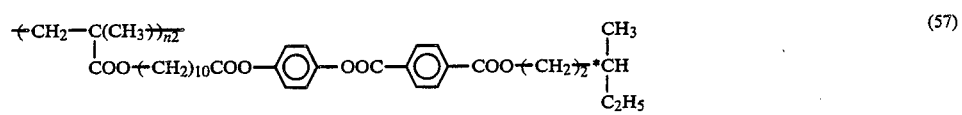 (57)
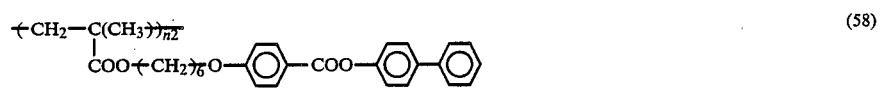 (58)
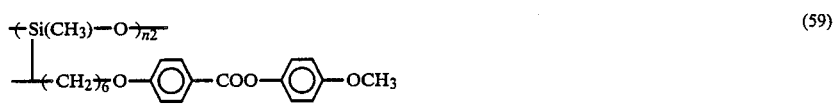 (59)
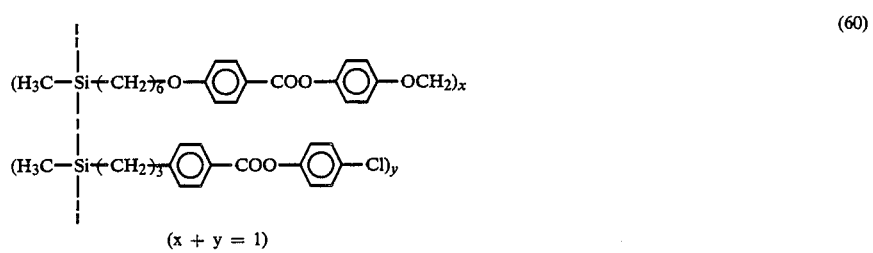 (60)
(x + y = 1)

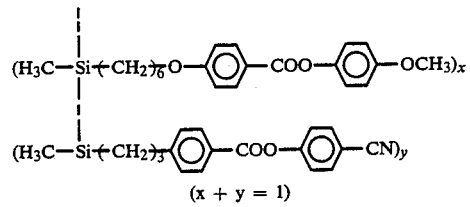

(61)

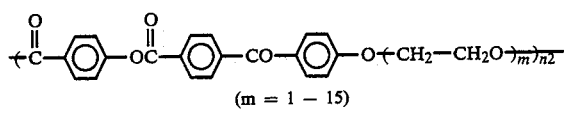

(62)

The above polymer liquid crystals may be use singly or in combination of two or more species.

In order to form a recording layer, a polymer liquid crystal may be dissolved in a solvent to form a solution for application. Examples of the solvent used for this purpose may include: dichloroethane, dimethylformamide (DMF), cyclohexane, tetrahydrofuran (THF), acetone, ethanol, and other polar or non-polar solvents, and mixtures of these. Needless to say, these solvents may be selected based on consideration of such factors as dissolving power of the polymer liquid crystal used, and the material of or wettability of the substrate or surface layer formed thereon to be coated thereby.

A good recording layer may be formed by applying such a solution of a polymer liquid crystal in a solvent onto a substrate by bar coating, spin coating, dipping, etc., followed by drying. The thus formed polymer liquid crystal film can be heated to a temperature above the isotropic phase and then rapidly cooled to provide a better state.

The recording layer may be formed in thickness of generally on the order of 1–100 microns.

In a preferred embodiment of the present invention, the recording layer may be formed from a polymer liquid crystal which has a glass transition temperature and at least two liquid crystal phases, and the recording layer may be selectively supplied with energy at multi-values of at least two levels, so that the polymer liquid crystal at the respective record portions may be selectively heated to a prescribed liquid crystal phase or isotropic phase and then rapidly cooled to effect multi-value recording at a high contrast. In this embodiment, a polymer liquid crystal having a glass transition point is used and rapidly cooled to provide a multi-value record with remarkably improved stability at a temperature below the glass transition point. Specific examples of phase transition pattern of the polymer liquid crystal showing at least two different liquid crystal phases may include the following:

SmA→Ch.→Iso.

SmC*→SmA→Ch.→Iso.

SmC*→Ch.→Iso.

SmC*→SMA→Iso.

Herein, "rapid cooling" means a step of cooling to room temperature or below a glass transition point at a rate sufficient to substantially fix the microstructure before the cooling without causing a substantial growth of an intermediate (liquid crystal) phase.

In case where the reproduction of a record is effected by detecting a change in reflectance or transmittance of a light beam, a high reflectance or transmittance of readout light is attained when the recording layer is set from the isotropic phase. When the recording layer is structurally set from the cholesteric phase or chiral smectic C phase, selective absorption or reflectance of light is caused so that specific values of reflectance and transmittance are attained in response to light with a wavelength depending on the helical pitches of the liquid crystal phases. On the other hand, if the recording layer is set from an optically inactive phase, such as SmA phase or N phase, the resultant recording layer becomes opaque or turbid, thus showing a low reflectance or transmittance over the substantially whole visible region.

Thus, the present invention provides a multi-value recording method wherein the reflectance and the transmittance of a light with a specific wavelength remarkably change depending on the kinds of the liquid crystal phase to micro-structurally fixed.

A record portion in the recording layer may be formed by heating with laser light or a thermal head. The selection of a liquid crystal phase formed by heating may be effected by intensity modulation of the laser light, heat control of the thermal head, etc. The record state is not necessarily restricted to a single state for one liquid crystal phase. If the change of helical pitch in cholesteric phase or chiral smectic C phase is utilized, multiple states with respect to reflection or absorption of light can be selected for one of these phases, so that an increased number of data recording bits can be attained for one spot.

In order to increase the temperature range for a liquid crystal phase or the kinds of liquid crystal phase, it is possible to blend a plurality of polymer liquid crystals or use a blend with an appropriate low-molecular weight liquid crystal.

In the present invention, it is also possible to effect a multi-value recording by using a recording medium having a recording layer comprising a polymer liquid crystal with a glass transition point as described above and controlling the liquid crystal proportion of the polymer liquid crystal at a record portion so as to provide a continuously changing optical density at the record portion.

In case where a polymer liquid crystal recording medium is used for continuous gradational writing by using its isotropic glass state as a non-record state, a record bit is held at a temperature above the glass transition point and below the isotropic phase transition temperature of the polymer liquid crystal for a controlled period of conversion into liquid crystal. A temperature below the glass transition point is not practical because it provides too low a rate of liquid crystal conversion.

On the other hand, a temperature above the isotropic phase transition temperature cannot be used because the liquid crystal conversion is failed. On the other hand, in case where a liquid crystal phase is used as a non-record state, a record bit is held at a temperature above the isotropic phase transition temperature for a controlled period for phase transition. If the isotropic phase transition temperature is not constant but has a distribution, the liquid crystal proportion can also be controlled by controlling the temperature for phase transition.

In case where a thermal head is used for writing on the recording medium so as to control the liquid crystal proportion, the current supplied to the head is controlled along with the control of the voltage, duration, duty ratio, etc., of a pulse.

In case where light illumination is used for writing, it is effective to add a light-absorbing layer or to incorporate a colorant or pigment in the recording layer.

Examples of the colorant used for this purpose or in other modes of recording in the present invention may include the following:

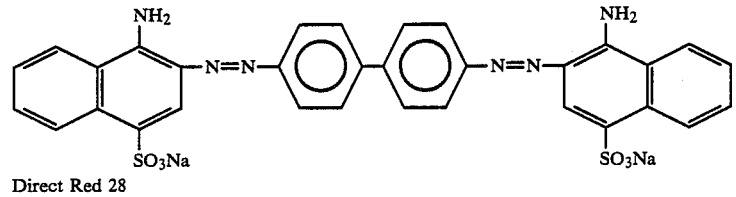
Direct Red 28

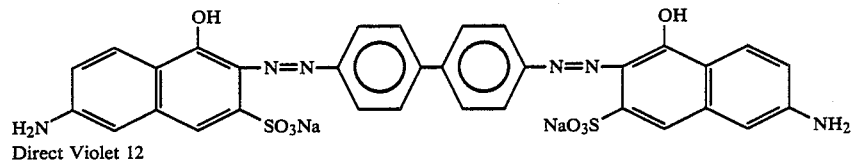
Direct Violet 12

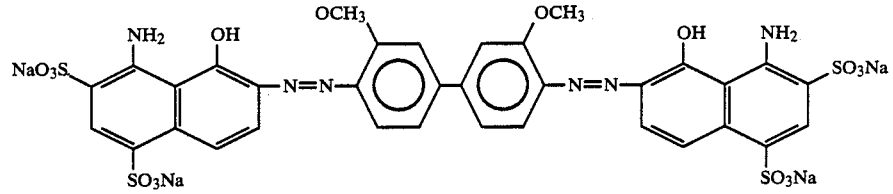
Direct Blue 1

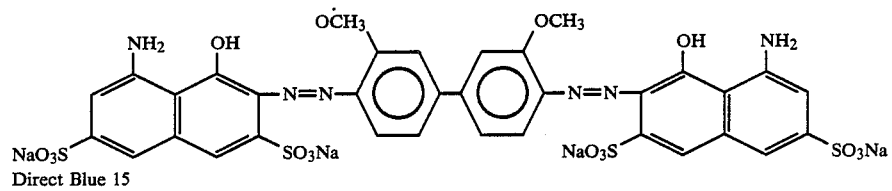
Direct Blue 15

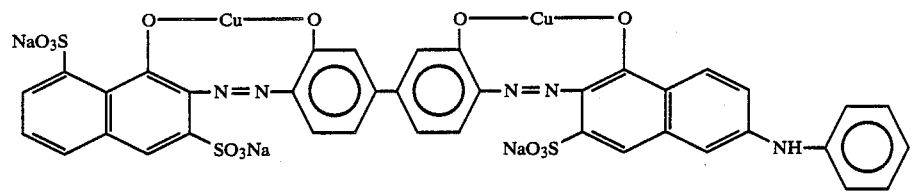
Direct Blue 98

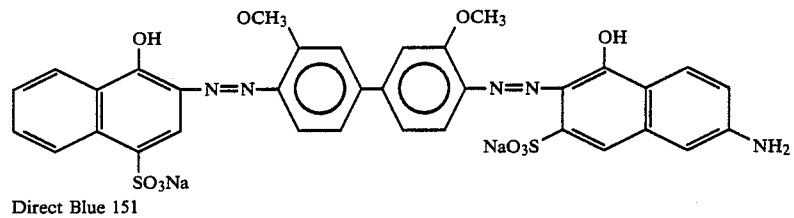
Direct Blue 151

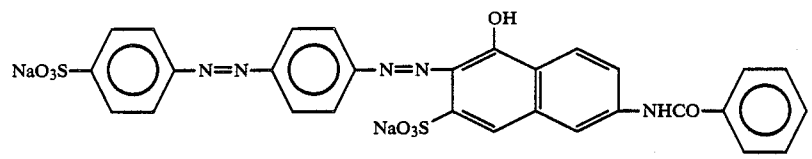

-continued
Direct Red 81
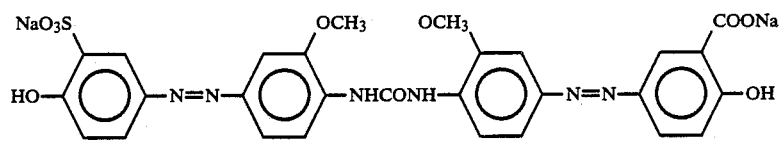
Direct Yellow 44
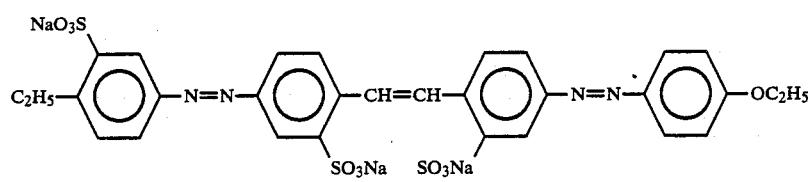
Direct Yellow 12
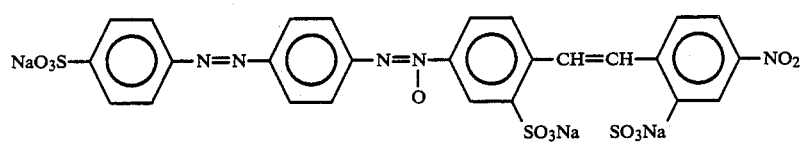
Direct Orange 39
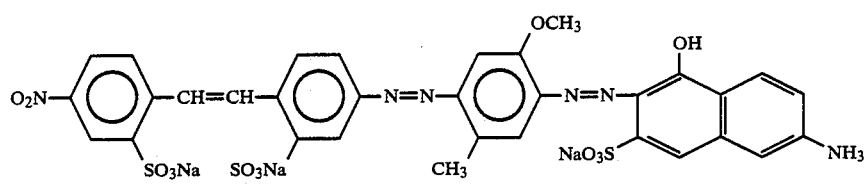
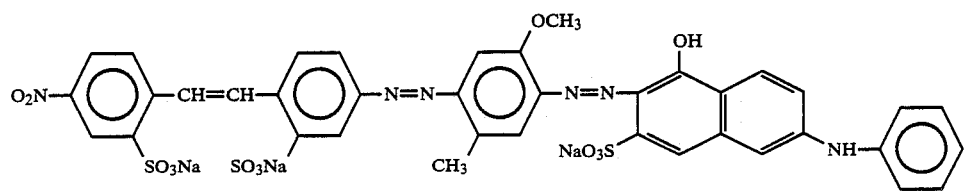
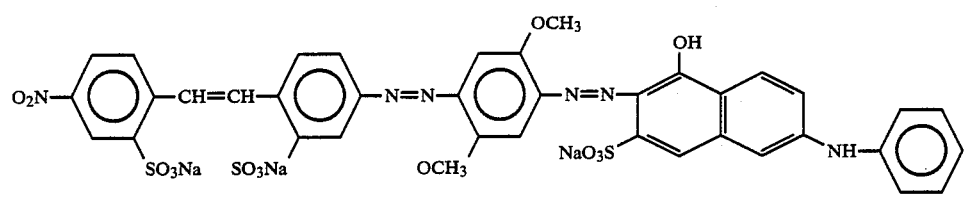
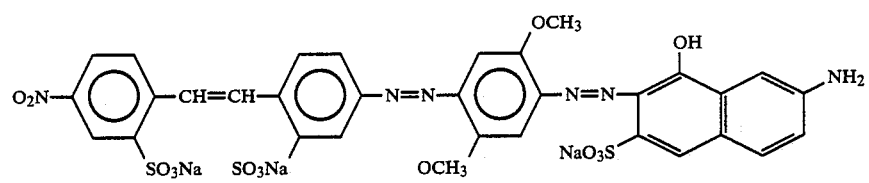
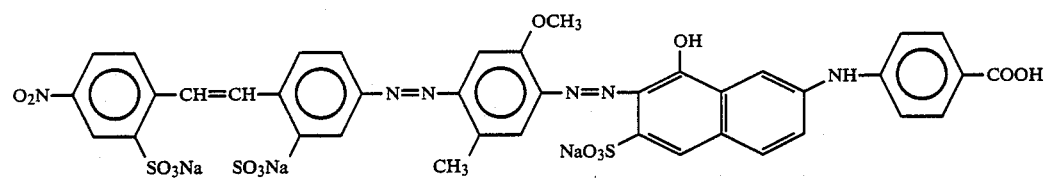

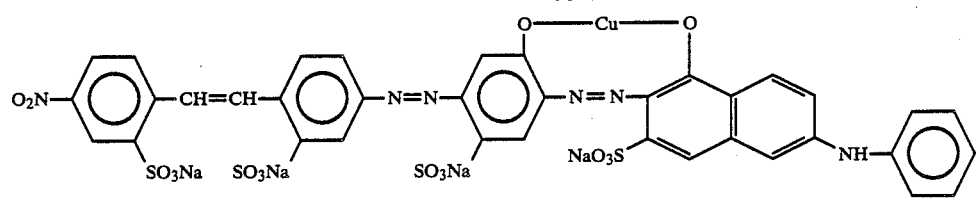
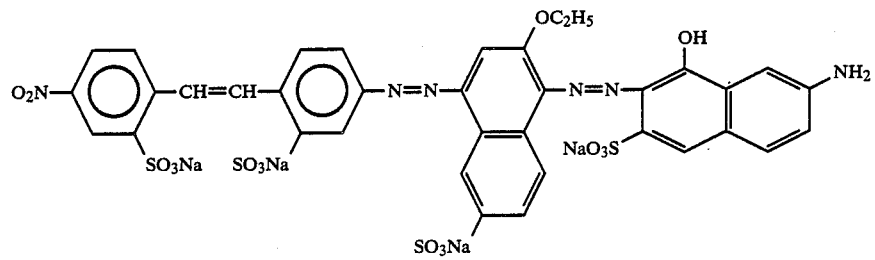
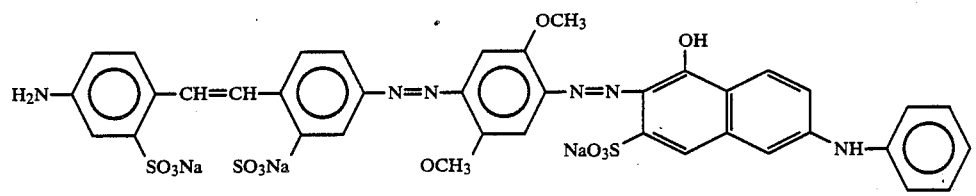
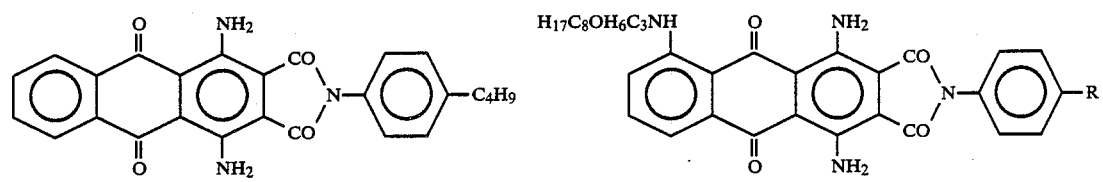
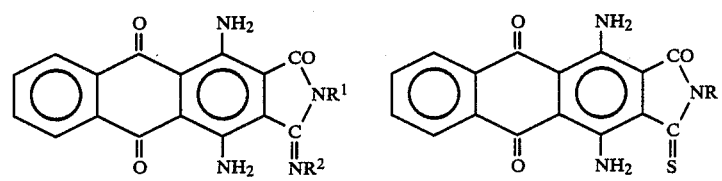
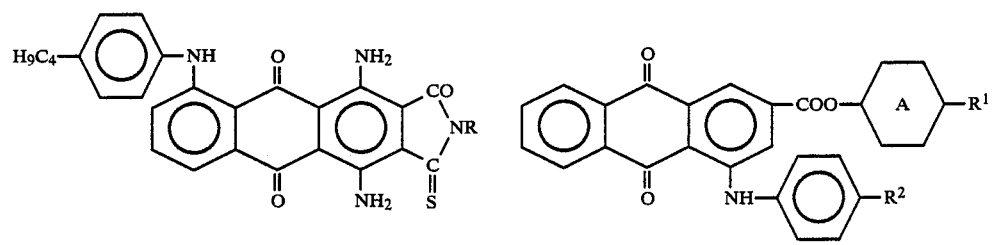
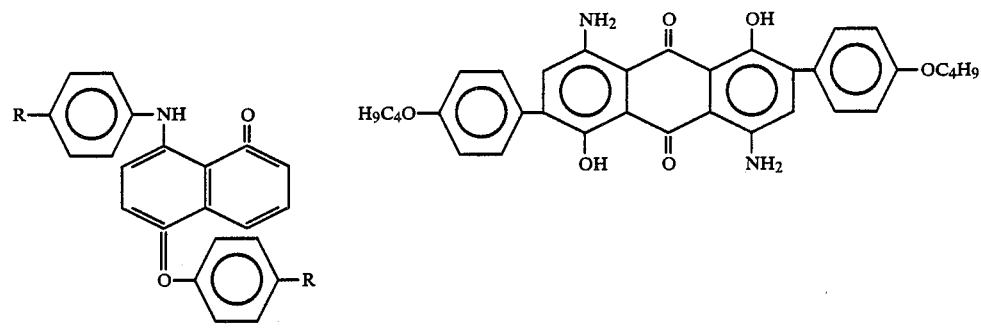

-continued
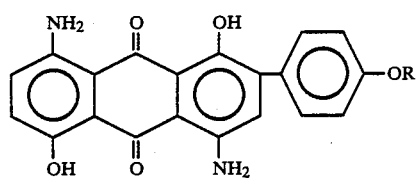
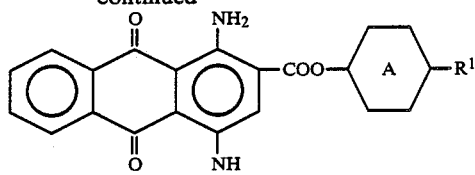
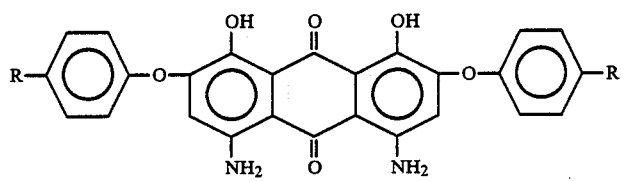
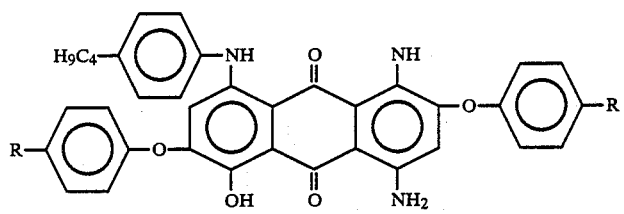
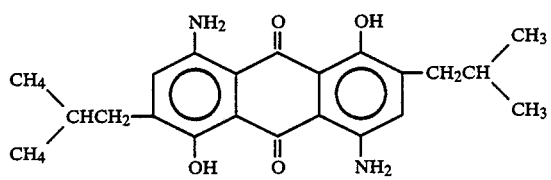
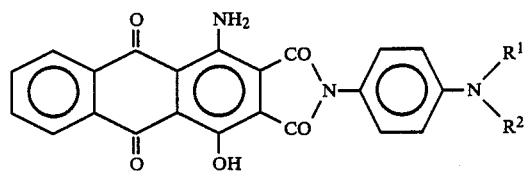
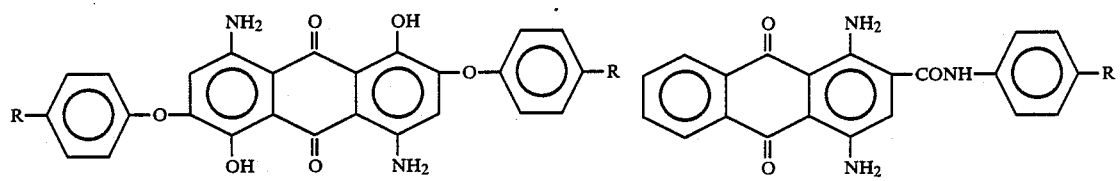
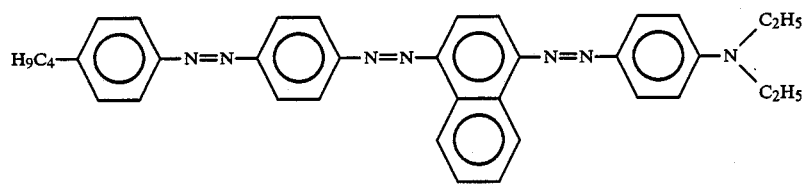
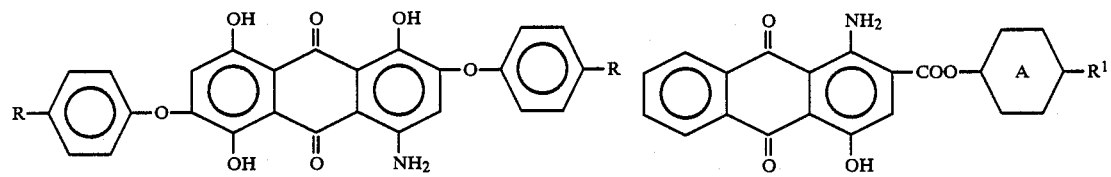
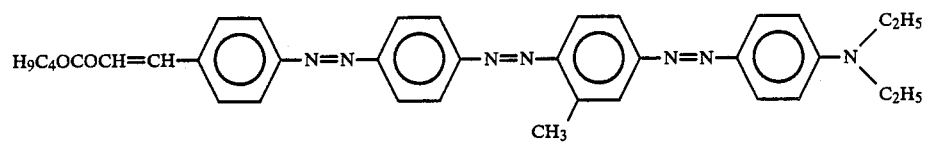

-continued
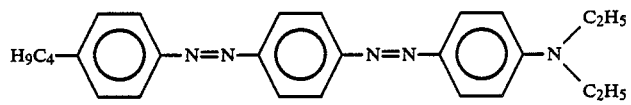
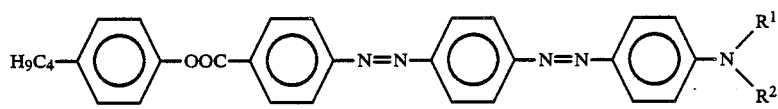
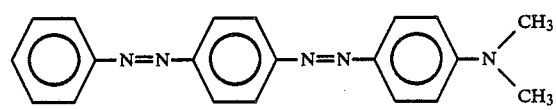
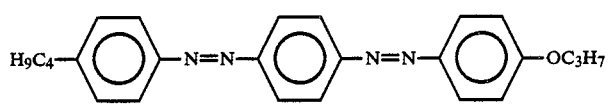
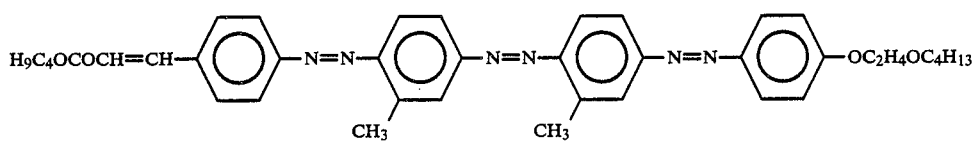
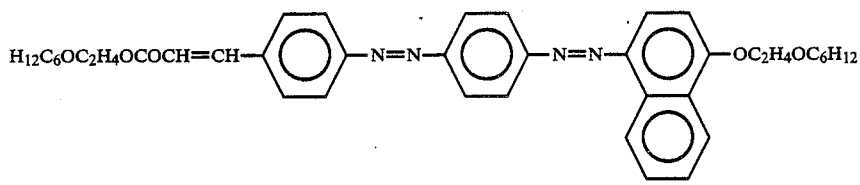
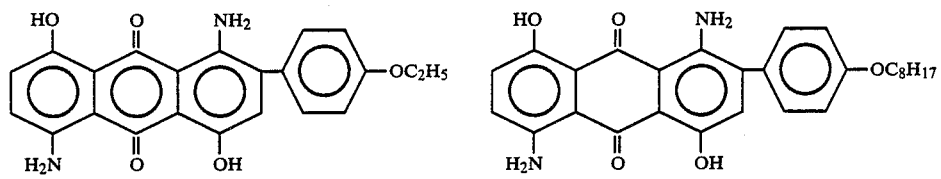
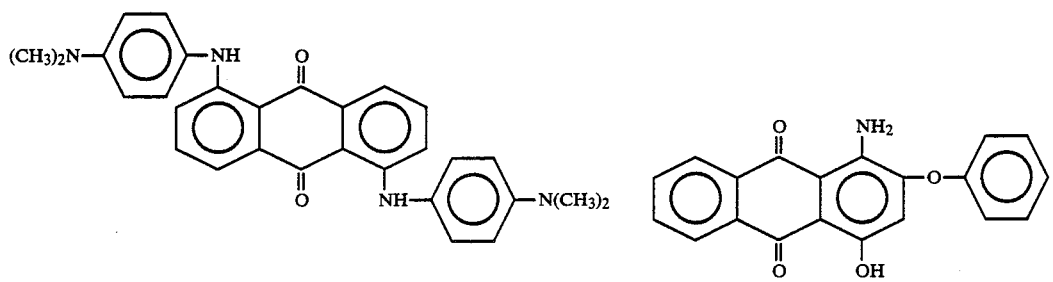
Disperse Blue 214
Disperse Red 60
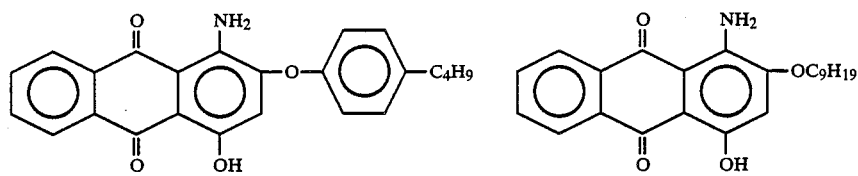

-continued

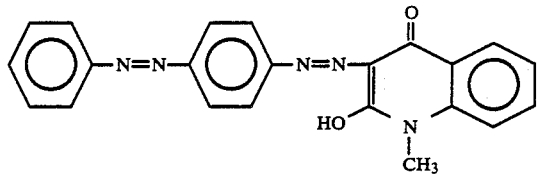

Disperse Yellow 56

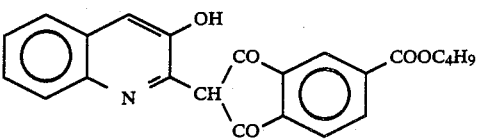

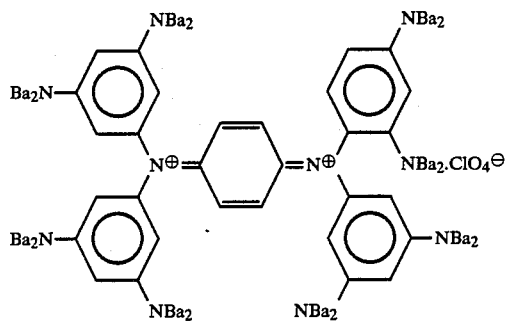

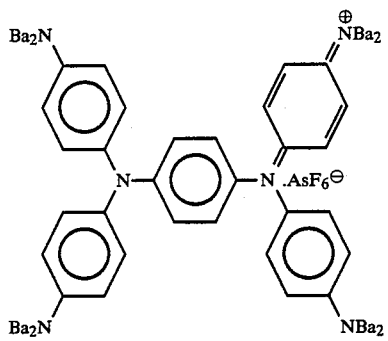

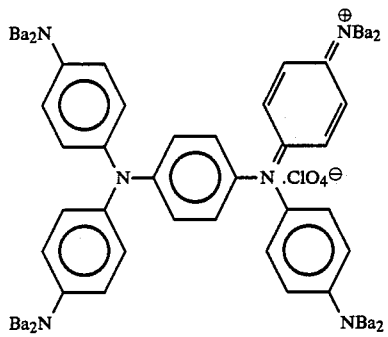

In the above-described manner, a continuous gradational recording may be effected by use of a thermal head or modulation of writing light to provide a controlled liquid crystal proportion, thereby to continuously change the optical density of a record portion (a specific example is shown in FIG. 2 which will be explained in further detail hereinafter).

A specific example of the recording medium having a polymer recording layer which comprised a polymer liquid crystal represented by the following formula (I) (corresponding to formula (52) described hereinabove):

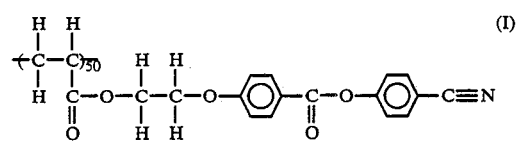

$\overline{M}w = 18,000$

Glass $\xrightarrow{75° C.}$ Liquid crystal phase (N) $\xrightarrow{110° C.}$ Iso.

The above polymer liquid crystal was dissolved in dichloroethane to form a 20 wt. % solution, and the solution was applied on a transparent polyester substrate which was washed in advance, followed by standing in the atmosphere of 95° C. for 10 minutes, whereby an about 10 micron-thick white scattering film was formed.

The thus formed white sheet was scanned in contact with a thermal head in the pattern of letters and images, whereby a scanned pattern was fixed in a transparent state. The sheet was then placed on a black background having an optical density of 1.2, whereby a clear black display was formed against the white background.

Then, the whole area of the above sheet having the above-mentioned pattern was heated to about 120° C. and then heated at about 90° C. for several seconds, whereby the original white scattering state was restored on the whole area and stably retained even if cooled to room temperature as it was, so that additional recording and display were possible.

The above series of phenomena can be controlled based on the fact that the above-mentioned polymer liquid crystal can assume at least three states including a film state below the glass transition point where it retains a stable memory state, a liquid crystal state where it can be transformed into a substantially optical scattering state and an isotropic film state at a higher temperature where it assumes an isotropic molecular alignment.

Now, the principle process of image formation by using a polymer liquid crystal layer formed on a transparent substrate is explained with reference to FIG. 5, which shows changes in reflectance or scattering intensity of a polymer liquid crystal layer versus temperature.

Referring to FIG. 5, the above-mentioned scattering state corresponds to a state ①. When the polymer liquid crystal layer in the state ① is heated by a heating means, such as a thermal head or laser light, to a temperature about $T_2$ (Tiso=isotropic state transition temperature) along a path denoted by ①a and then rapidly cooled, a light-transmissive state as shown by ③ similar to the isotropic state is fixed. Herein, "rapid cooling" means cooling at a rate sufficiently large as to fix the state before the cooling without substantial growth of an intermediate state, such a lower-temperature liquid crystal phase. Such a rapid cooling condition can be realized without a particular cooling means and by having the recording medium stand in air for natural cooling. The thus-fixed isotropic state is stable at a temperature below $T_1$ (Tg: glass transition point), such as room temperature or natural temperature, and is stably used as an image memory.

On the other hand, if the polymer liquid crystal layer heated to above $T_2$ is held at a liquid crystal temperature between $T_1$ and $T_2$ for a period of, e.g., 1 second to several seconds, the polymer liquid crystal layer increases the scattering intensity during the holding period as indicated by a curve ①b to be restored to the original scattering state ① at room temperature. The resultant state is stably retained at a temperature below $T_1$.

Further, if the polymer liquid crystal layer is cooled while taking a liquid crystal temperature between $T_1$–$T_2$ for a period of, e.g., about 10 milliseconds to 1 second as indicated by curves ②, an intermediate transmissive state is obtained at room temperature, thus providing a gradation.

Thus, in this embodiment, the resultant transmittance or scattering intensity may be controlled by controlling the holding period at a liquid crystal temperature after heating into an isotropic state and until cooling to room temperature. The resultant state may be stably retained below $T_1$.

According to another embodiment of the present invention, there is provided a multi-value recording method wherein a recording layer comprising a polymer, such as a polymer liquid crystal (inclusive of those represented by the formulas (1)–(62) described hereinabove) and a phase separation polymer is heated under control in the direction across the thickness so as to provide a controlled optical variable.

FIGS. 6A, 6C and 6E are schematic partial sectional views for illustrating an organization and principle of the above embodiment, and FIGS. 6B, 6D and 6F are schematic plan views corresponding thereto.

Referring to FIG. 6A–6F, a recording medium 61 comprises a substrate 62 and a polymer layer 63 thereon, an image forming region 63a of which is heated by heating means 64. The heating means 64 may be either in contact with or separate from the recording medium 61.

The respective states are explained. FIGS. 6A and 6B show a state where no heat is supplied from the heating means 64 to the polymer layer 63, whereby the polymer layer 63 assumes a solid state at room temperature. In this state, the polymer layer can assume both transparent and scattering states as described above. Hereinbelow, however, this state is referred to as transparent.

FIGS. 6C and 6D show a state where a heat is supplied from the heating means 64, so that the image forming region is changed from a scattering state to a transparent state. In order to change the image forming region from a scattering state to a transparent state, the region is required to have a temperature of $T_2$ (Tiso) or above.

FIGS. 6E and 6F show a state which is somewhat similar to that one shown in FIGS. 6C and 6D. In this state, however, about a half of the thickness of the polymer layer 63 in the image forming region 63a has been changed from a scattering to a transparent state. This is accomplished by controlling the thicknesswise portion of the image forming region reaching a temperature of $T_2$ or above. This state is optically intermediate between the scattering state shown in FIGS. 6A and 6B and the transparent state shown in FIGS. 6C and 6D. We have confirmed that such an intermediate state formed by a combination of different optical portions across the thickness can be formed by a recording layer having a thickness on the order as small as 1–100 microns.

Accordingly, through the above-mentioned thicknesswise control, an optical variable (such as transmittance or reflectance) is selectively controlled.

Further, through a series of experiments giving the results shown in FIG. 5 by using the polymer liquid crystal represented by the above formula (I), we have confirmed that the speed of the polymer layer being restored to the scattering state is higher at a temperature closer to $T_2$ in the liquid crystal temperature region, and that restoration to the scattering state ① can be effected without once heating to isotropic phase and regardless of the previous state if the polymer layer is held in the liquid crystal temperature range for a long period.

Figure 18:
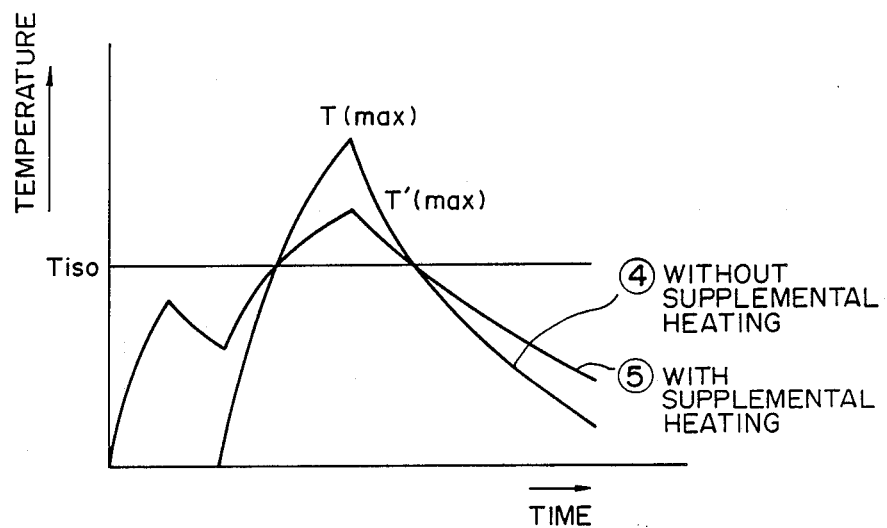
FIG. 18 is a graph showing temperature changing characteristics of a polymer liquid crystal.

FIG. 18 is a view showing a characteristic of the above-mentioned polymer liquid crystal on temperature increase. Referring to FIG. 18, in case where the polymer liquid crystal is heated from room temperature without supplemental heating as indicated by curve ④, heating up to T(max) is required in order to provide an isotropic phase necessary for writing.

On the other hand, in case where supplemental heating has been effected in advance as indicated by curve ⑤, it is possible to provide an isotropic phase necessary for writing by heating up to T'(max).

In other words, by effecting supplemental heating, excessive heat application to the liquid crystal can be alleviated so that not only prevention of deterioration and surface protection can be effected but also a heat energy from imagewise heating means can be decreased. Further, it is also effective for providing a clear image at a high contrast.

Herein, "supplemental heating" refers to a heating which is effected in advance of imagewise heating to heat the recording layer to a temperature not causing a phase transition for writing in the recording layer (e.g., Tiso (isotropic phase transition temperature)) More specifically, the supplemental heating may be generally effected to heat the recording layer to a temperature (the neighborhood of the phase transition temperature) in the range of from a lower side temperature which is generally about a mid point between room temperature (25° C.) and the phase transition temperature for writing of the recording layer to an upper side temperature which is the lower one of a temperature of 2°-5° C. below the phase transition temperature and a temperature which is lower than the phase transition temperature by 1/10 of the temperature difference between the phase transition temperature and room temperature. In case where the phase transition temperature is different whether it is on heating or cooling, the one on heating is used for the above purpose.

Hereinbelow, the present invention will be explained more specifically based on examples.

EXAMPLE 1

A writing and readout system including a semiconductor laser as shown in FIG. 1 was prepared and used.

A laser beam of 830 nm from a semiconductor laser was passed through a polarization beam splitter 12 and a quarter wave plate 13 to be converted into a circular polarized light, which was then focused through an objective lens 14 onto a recording layer 17 of a recording medium 15. A detector 19 was arranged to receive a reflected light from the recording layer through the polarization beam splitter 12.

More specifically, the recording medium 15 was prepared by coating a 1.2 mm-thick glass substrate 16 with a coating liquid, which had been prepared by dissolving the following polymer liquid crystal (n=50):

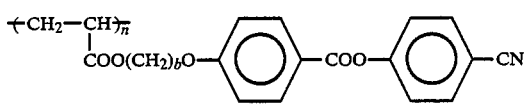

in cyclohexanone to form a 10 wt. % solution and adding thereto the following near infrared-absorbing colorant in a proportion of 1 wt. % of the polymer liquid crystal:

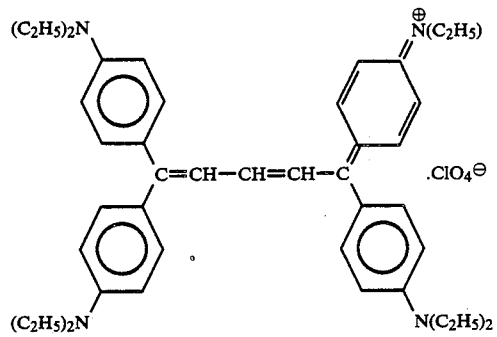

The coating liquid was uniformly applied by means of a bar coater and dried to form a 5 microns-thick polymer liquid crystal layer 17, which was then coated with a 2000 Å-thick aluminum reflection layer 18 by vapor deposition.

The polymer liquid crystal layer 17 in this state was uniformly transparent and showed a transmittance of about 40%.

The above recording medium was irradiated with a laser light at a power of 5 mW (as measured on the recording medium) for varying periods, and the change in reflectance from the recording medium as shown in FIG. 2 versus the time was obtained. As shown in FIG. 2, the reflectance change was almost proportional to the laser irradiation time in the reflectance range of 24–40%.

Further, it was also confirmed that a display could be stably formed at three reflectance levels of 40%, 33% and 25%.

EXAMPLE 2

Figure 3:
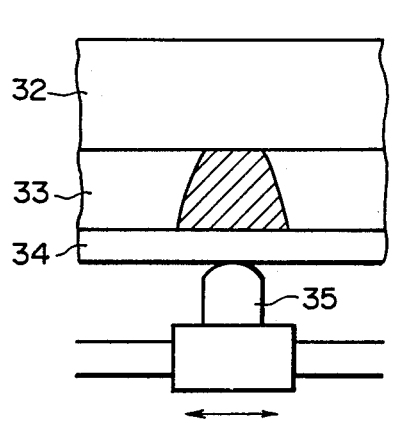
FIG. 3 is a schematic view of a writing apparatus using a heat-generating head for effecting the recording method of the present invention.

A writing system as illustrated in FIG. 3 including a thermal head was prepared and used.

A 1.2 mm-thick glass substrate 32 was uniformly coated with a 20 wt. % solution of the polymer liquid crystal of Example 1 in cyclohexanone by means of a bar coater and dried to form a 10 micron-thick recording layer, which was then coated with a 2000 Å-thick aluminum reflection layer 34.

A thermal head 35 was energized by a 5 V-rectangular wave at 100 KHz while being disposed in contact with the reflection layer 35, whereby the reflectance of the medium was changed from 90% to 40% in 30 sec.

Further, a fixed image having three reflectance levels of 80%, 60% and 45% was obtained by controlling the writing time.

EXAMPLE 3

Figure 4:
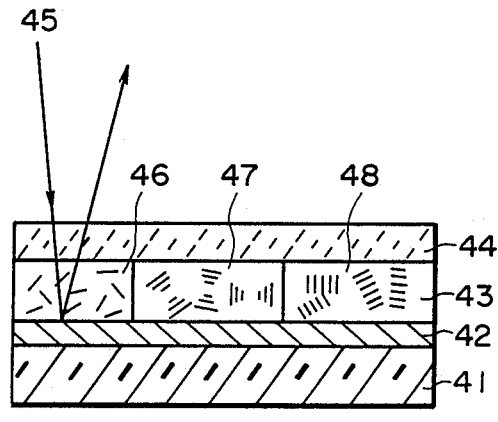
FIG. 4 is a schematic sectional view showing a laminar structure, of a recording medium used in Examples 3 and 4 appearing hereafter.

A recording medium having a laminar structure as illustrated in FIG. 4 was prepared.

First, a disk-shaped glass substrate 41 of 130 mm in diameter and 1.2 mm in thickness was coated with a 2000 Å-thick vapor-deposited aluminum metal layer as a reflection layer 42, which was then coated with a 5 wt. % solution in 1,1,2-trichloroethane of a polymer liquid crystal (glass transition point: 85° C.) of the following formula (n=50):

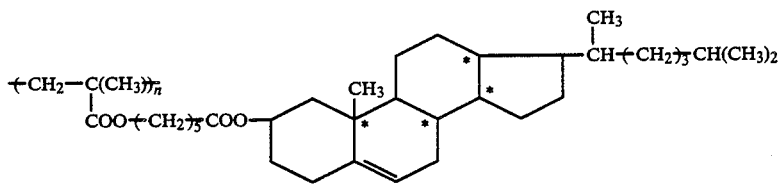

by means of a spinner rotating at 3000 rpm, followed by drying to form a 10 micron-thick polymer liquid crystal layer 43.

Then, the polymer liquid crystal layer 43 was further coated with a 1 micron-thick polyimide film 44 as a protective layer by pressure-lamination to prepare a recording medium.

Then, the recording layer 43 of the thus-prepared recording medium was entirely heated by a 10 mW-semiconductor laser beam 45 into an isotropic phase (46) and then rapidly cooled by standing in air to form an initial state, which showed a reflectance of 87% for a 0.2 mW-semiconductor laser light of 830 nm wavelength.

Then, portions 47 and 48 of the recording layer were irradiated with a writing laser beam at a power of 15 mW and 5 mW, respectively, followed by standing in air for rapid cooling. The resultant portions 47 and 48 showed a reflection of 50% and 10%, respectively, for a 0.2 mW-semiconductor laser light of 830 nm, whereby data recording was effected at three levels including the reflectance of 87% given by the remaining portion 46.

Thus, the portion 47 heated by the semiconductor laser beam at a power of 15 mW was heated into cholesteric liquid crystal phase and rapidly cooled by standing in air to fix the structure, thus causing selective light-scattering. The portion 48 heated by the semiconductor laser beam at a power of 5 mW was heated into smectic A phase, and the structure was fixed by the rapid cooling to cause a higher degree of light scattering, i.e., to show a low reflectance of 10%.

Further, the recorded portions 47 and 48 were then irradiated with a semiconductor laser beam at a power of 20 mW, followed by rapid cooling, whereby the original state was restored and the erasability was confirmed.

EXAMPLE 4

A disk-shaped recording medium of the same structure as used in Example 3 was subjected to writing by means of a thermal head instead of the semiconductor laser. Portions of the recording layer was heated to 150° C. and 200° C. by applying heat pulses for different periods from the thermal head, followed by rapid cooling, whereby these written portions were fixed while retaining the micro-structures of smectic A phase and cholesteric phase, respectively. The thus formed written portions showed a reflectance of 10% and 45%, and the non-written portion showed a reflectance of 87%, respectively, for a semiconductor laser beam of λ (wavelength)=830 nm and a power of 0.2 mW.

Further, the recording layer was heated to isotropic phase by increasing the heat energy from the thermal head and then standing in air for cooling, whereby the written portions were erased, and the initial reflectance was restored.

EXAMPLE 5

A glass plate the same as used in Example 3 was coated with a polymer liquid crystal of the following formula (n=8, x=0.4) heated to isotropic phase by means of a glass plate as used in Example 3 by means of a knife coater in a thickness of 10 microns, followed by cooling, to form a recording layer:

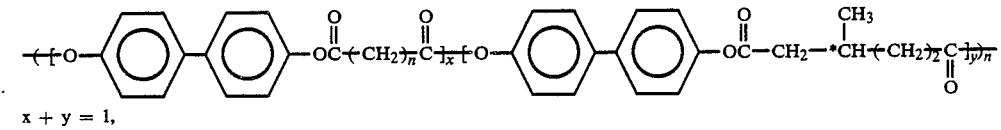

x + y = 1,

The recording layer was coated with a polyimide film as a protective layer, and the thus formed laminated structure was heated to provide the polymer liquid crystal with isotropic phase, followed by cooling to obtain a transparent recording medium.

Portions of the recording layer of the recording medium thus prepared were heated to 180° C., 220° C. and 250° C., respectively, by applying heat pulses from a thermal head, whereby these portions were fixed while retaining smectic phase (180° C.) and cholesteric phases (220° C. and 250° C.).

The reflectances of the respective portions in the recorded portions were measured to be 0.8, 0.5 and 0.3, respectively, relative to that of the non-recorded portion for a laser beam at a wavelength λ=633 nm.

Then, the recording layer was entirely heated to above 280° C. by the thermal head, whereby the transmittance of the recorded portions was made the same as that of the non-recorded portion and the possibility of rewriting was confirmed.

EXAMPLE 6

Figure 7:
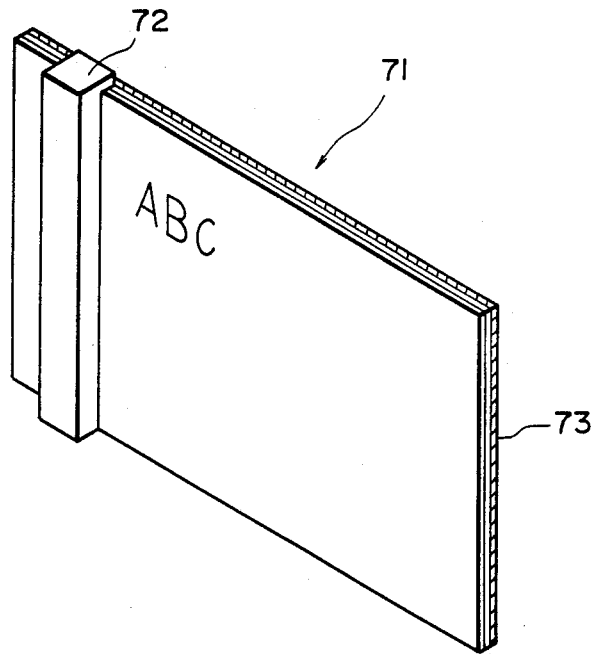
FIG. 7 is a schematic perspective view of a display apparatus utilizing the present invention.
Figure 8:
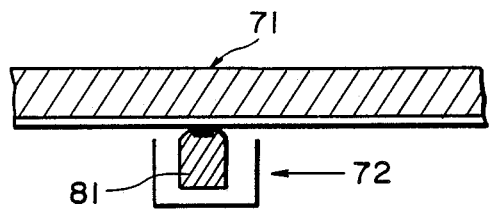
FIG. 8 is a schematic sectional view of a recording and readout section of the display apparatus.
Figure 9:
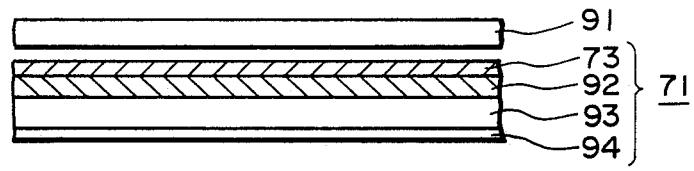
FIG. 9 is a sectional view of a recording medium used in the display apparatus.

FIG. 7 is a schematic view of the display apparatus according to the present invention, FIG. 8 is a sectional view of a writing section thereof, and FIG. 9 is a schematic sectional view of a recording medium.

In the display apparatus, a writing unit 72 provided with a thermal head 81 as shown in FIG. 8 was moved by a driving unit (not shown) to form an image on a recording medium 71 as explained above. On the backside of the recording medium 71 is disposed a planar heat-generating member 73 for erasure of a written image.

Referring to FIG. 9, an example of such a recording medium 71 may be formed by coating a substrate 92 comprising a transparent resin such as polyethylene terephthalate, glass or ceramic with a polymer liquid crystal 93 and then with a protective layer 94 for protection from damage, dust or heat or damage by heat application means, which is a coating or laminated layer comprising a fluorine-containing resin, silicone resin, etc., or a polymer liquid crystal having a sufficiently high glass transition point Tg which is preferably higher than Tiso (isotropic phase transition temperature) of the polymer liquid crystal layer 93.

For effecting the display, the polymer liquid crystal layer 93 is placed in a light-scattering state to provide a white display place, and an image formed on the recording medium 71 is formed in a transparent state or a state close thereto.

In case where the substrate 92 and the planar heat-generating member 73 (e.g., when composed of ITO (indium-tin-oxide), tin oxide, etc.) are transparent, an improved image contrast may be obtained if a back plate 91 of a black or chromatic color is disposed on the back side. The back plate 91 can be disposed either separately as shown from or in contact with the recording medium 71. It is also possible to dispose a planar light source of a chromatic color instead of the back plate 91. A similar effect can be obtained by incorporating or applying a pigment or dye in or on the substrate 92. Further, instead of using the substrate 92, it is also possible to directly form the polymer liquid crystal layer on the back plate 91 or on the planar heat-generating member 73.

Figure 10:
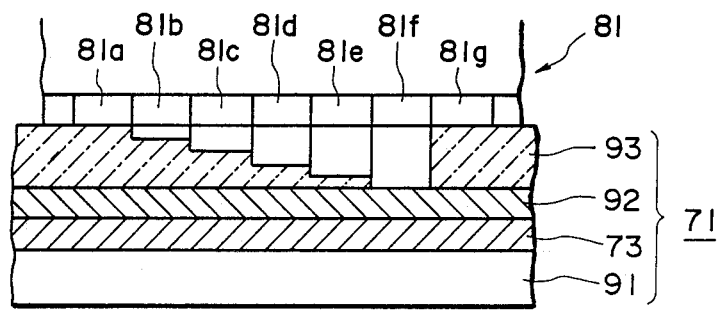
FIG. 10 is a schematic sectional view of the recording medium for illustrating a manner of writing.

FIG. 10 is a schematic sectional view for illustrating a writing system.

A thermal head 81 comprises a plurality of minute heat-generating elements 81a–84g . . . disposed in an array. In the illustrated state, an external OFF signal is applied to the minute heat-generating elements 81a and 81g, and no images are formed at the corresponding parts on the recording medium 71. Heat-generating elements 81b–81e are supplied with external ON signals and generating heats. According to this embodiment, minute heat-generating elements may be supplied with external signals with varying voltages, pulse durations, waveforms, etc., to generate variable quantities of heat, whereby the polymer liquid crystal layer is caused to have locally different thickness regions with a temperature exceeding Tiso where transparent regions are formed. Thus, a locally different optical variable may be realized. In the illustrated state, the minute heat-generating elements generate varying heat quantities in the order of $81a = 81g < 81b < 81c < 81d < 81e < 81f$, whereby the corresponding portions of the polymer liquid crystal layer assume multiple optical states ranging from a scattering state to a transparent state including intermediate states.

In a specific example, the elements 81a and 81g were respectively supplied with a 1 msec-rectangular pulse of 0 V; 81f, 12 V; 81b, 8 V; 81c, 9 V; 81d, 10 V; and 81e, 11 V. When a 10 micron-thick film of a polymer liquid crystal example of the formula (31) ($n_2 = 50$) was subjected to the heat application, the corresponding portions of the layer provided transmittances of about 20% (for 81b), about 40% (81c), about 60% (81d) and 80% (81e), with a relative scale giving transmittances of 0% for 81a and 81g and 100% for 81f.

Further, the thus recorded polymer liquid crystal layer was subjected to observation of a scattering state by placing a back plate on the side of the heat application and on the opposite side alternatively, whereby the opposite side showed an apparently larger surface scattering and it was confirmed that the transparent region was formed in the thicknesswise direction from the heat application side and with locally different thicknesses.

According to the above-mentioned display system, it is possible to provide a particularly high-quality image with an intermediate density.

EXAMPLE 7

Figure 11:
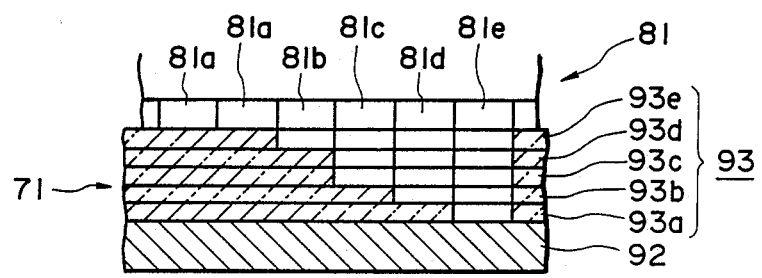
FIGS. 11 and 12 are sectional views showing other embodiments of the recording medium.

FIG. 11 is a schematic sectional view of a recording system which includes a recording medium having a multiple polymer liquid crystal layer structure 93.

The polymer liquid crystal 93 includes laminated unit layers 93a, 93b, 93c, 93d and 93e each in a thickness of about 1–100 microns, having respectively different polymer liquid crystal characteristics, e.g., different isotropic phase transition temperatures (Tiso), whereby an optical variable of the polymer liquid crystal layer can be controlled through control of scattering or transparent state by combination of varying heat application and various Tiso of the unit layers.

By using a laminated polymer liquid crystal layer 93 as described above, a clearer definition or separation of scattering and transparent regions can be provided in combination with appropriate temperature setting of minute heat-generating elements.

More specifically, when the unit layers have successively changing Tiso's from the heating elements side to the opposite side, e.g., $93a > 93b > 93c > 93d > 93e$, clear definition or separation between scattering and transparent regions as shown in FIG. 11 can be provided by changing heat quantities generated by the heat-generating elements, whereby clear contrasts depending on the generated heat quantities.

The respective unit layers can be arranged apart from the relationship of Tiso values, if they provide a clear separation between scattering and transparent states.

EXAMPLE 8

Figure 12:
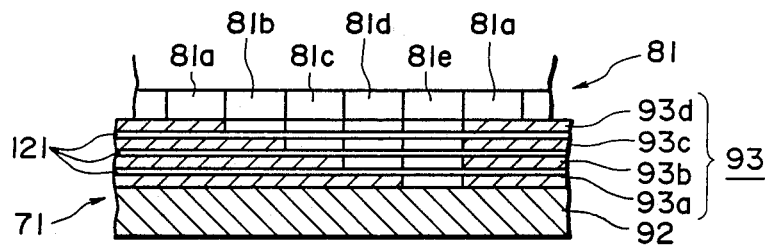

FIG. 12 is a schematic sectional view of another recording system which includes a recording medium 71 having a laminated recording layer comprising unit polymer liquid crystal layers 93a, 93b, 93c and 93d and also intermediate polymer films 121 disposed between the respective unit polymer liquid crystal layers. The intermediate films 121 respectively comprise a polymer material which is heat-resistant at a temperature above Tiso, such as polyethylene terephthalate, and polyimide.

According to this example, by selecting a heat conduction condition for the respective layers, a clearer definition between scattering-transparent states or regions can be attained.

The thickness of the respective layers and the number of the layers may be determined depending on the total thickness of the recording medium and usage thereof.

Generally, each of the unit polymer liquid crystal layers 93a–93d . . . may have a thickness in the range of about 1–100 microns. Each of the intermediate layers 121 may have a thickness in the range of 0.1–10 microns which may be 0.1–3 times, preferably 0.1–1 times, the thickness of a unit polymer liquid crystal layer. The total thickness of the laminated recording layer should preferably be so restricted as to provide "rapid cooling" as defined above by natural cooling as by standing in air.

EXAMPLE 9

Figure 13:
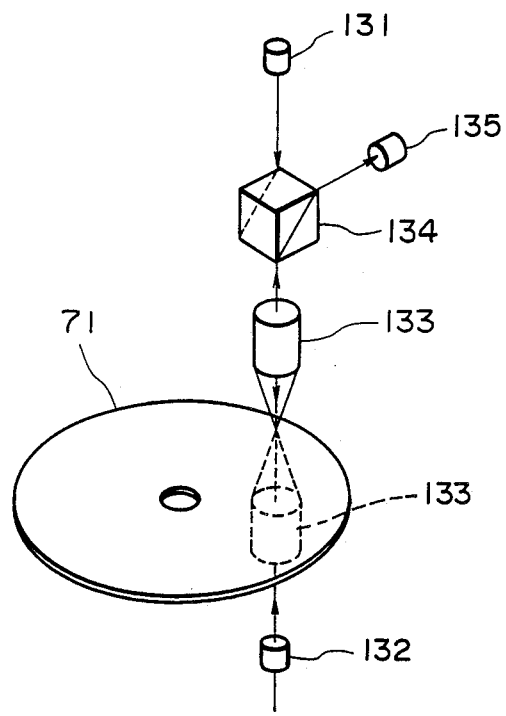
FIG. 13 is a perspective view illustrating an outline of a memory apparatus.
Figures 14A, 14B:
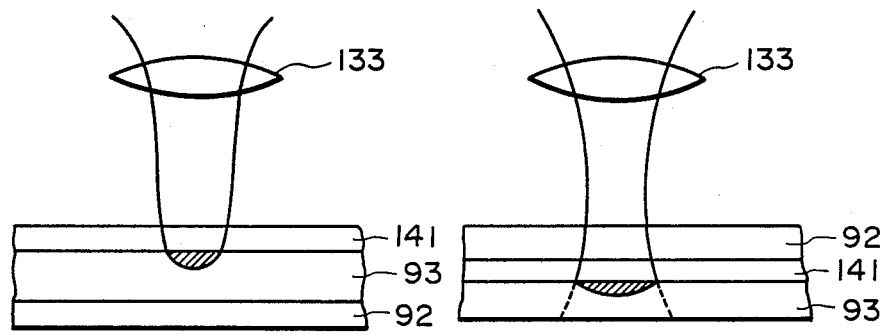
FIGS. 14A and 14B are schematic sectional views of a recording medium used as a memory.

FIG. 13, 14A and 14B illustrate a system using a disk-shaped recording medium 71.

FIG. 13 is a schematic perspective view of a recording (writing and memory) system including a recording medium as described above, and FIGS. 14A and 14B are schematic sectional views for illustrating the laminar structure of the medium and writing principle.

The recording medium 71 comprises a substrate 92 of glass or transparent plastic such as polyethylene terephthalate, a polymer liquid crystal layer 93 as described above, and a light-absorbing layer 141 for converting a writing light into heat. The light-absorbing material may suitably be one showing an absorption in the wavelength region of the writing light and a high heat resistance. Examples thereof may include metals or colorants, such as platinum black and vanadium phthalocyanine, which are black or showing an absorption in the laser wavelength region.

In the system shown in FIG. 13, a writing laser 132 is one having a light-emission peak at 830 nm, e.g., a semiconductor leaser with a power of 50 mW, and a readout laser 131 is one having a light-emission peak at 780 nm, e.g., a semiconductor laser with a power of 3 mW. The beams from the respective lasers may be optically adjusted by a lens system 133, etc., corresponding to a bit size.

At the time of writing, the light-absorbing layer 141 absorbs a laser light and generates heat (FIGS. 14A, 14B). In this instance, an optical variable (transmittance or reflectance) can be controlled by modulating the laser light to control the heat conduction to the polymer liquid crystal layer 93.

In this system, an optical density change is read out by a photocell 135, and the readout signal is subjected to analog-to-digital conversion, to effect a multi-value recording. Thus, a recording medium or memory medium of a large capacity is provided.

In this example, the polymer liquid crystal is initially placed in a scattering state and heated in a controlled manner to form a transparent region in a controlled depth, thus controlling an optical variable.

Alteratively, the polymer liquid crystal can be placed in a transparent state, and a scattering region can be formed in a controlled manner by controlling the quantity of applied heat and cooling rate.

EXAMPLE 10

Figure 15:
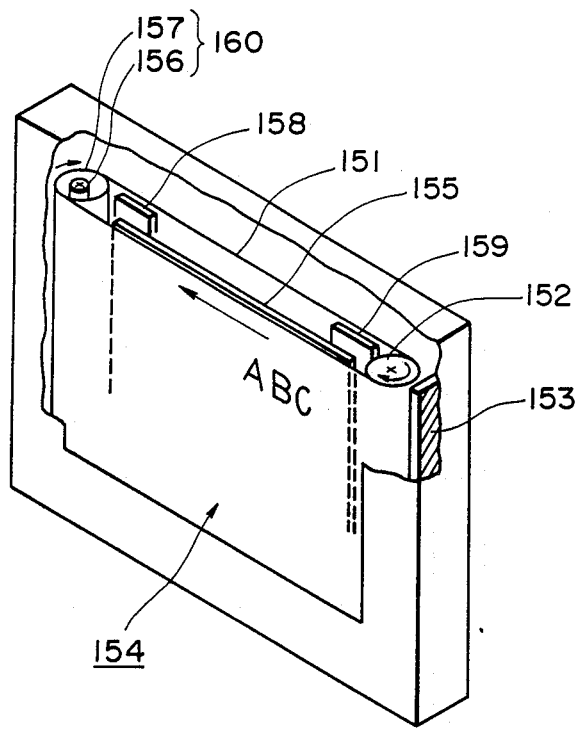
FIG. 15 is a schematic perspective view partly broken of a display apparatus according to the present invention.
Figure 16:
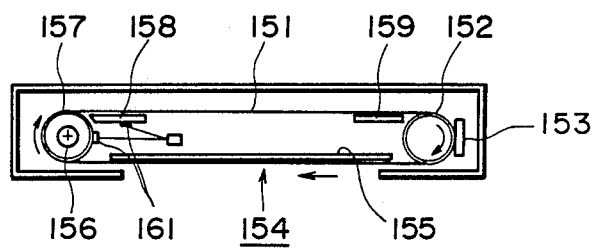
FIG. 16 is a sectional view of the display apparatus shown, in FIG. 15.

FIG. 15 is a partly broken schematic perspective view of another display apparatus according to the present invention, and FIG. 16 is a sectional view thereof.

The display apparatus has, on one lateral side thereof, a halogen heater 160 comprising a halogen lamp 156 and a roller 157, and on the opposite side thereof, a drive roller 152. A recording medium 151 is wound about the two rollers to form a display section 154 on its front side, and on the backside of the display section 154 is disposed a back plate 155. In the neighborhood of the halogen heater 160, an erasure planar heater 158 for image erasure is disposed and connected with a temperature sensor 161. Further, near the drive roller 152 are disposed a planar heater 159 which is a first heating means and is served as a supplemental heating means, and a thermal head 153 which is a second heating means and is used for image writing.

Incidentally, the drive motor 152 is driven by a motor (not shown) and other means may be also driven by electrical or electronic members (not shown).

In a specific example, the recording medium 151 was prepared by coating a transparent polyethylene terephthalate substrate with a 20 wt. % solution in dichloroethane of a polymer liquid crystal of the following structural formula:

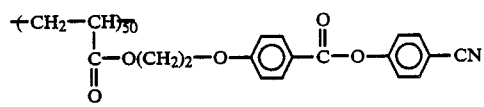

Glass $\xrightarrow{75° C.}$ Liquid crystal phase $\xrightarrow{110° C.}$ Iso.

by means of a wire bar, and dried in an oven at 90° C. for 15 min. to form a white scattering layer. Then the recording medium 151 was shaped into an endless form as indicated.

For image writing, the drive roller 152 is rotated in the arrow direction, and the recording medium 151 is heated by the planar heater 159 as a supplemental heating means. At this time, the planar heater 159 is held at a temperature close to the transition temperature from the liquid crystal phase to the isotropic phase, e.g., at about 95° C. The thus preliminarily heated recording medium 151 is then conveyed to pass by the thermal head 153. To the thermal head, an image signal, e.g., a facsimile signal sent from another facsimile transmitter, is supplied, whereby the heated portion of the recording medium in the form of a belt is transformed into a transparent image pattern. By continuing this operation, a transparent image is formed in an A4 page size and then stopped at the display section 154, whereby there is displayed on a white background a clear image of a chromatic or black color of the back late 155.

According to our visual evaluation, it was found that, for example, a black paper having an optical density of 1.0 or above used as a back plate could provide an image of a sufficiently high contrast. Alternatively, if a color paper of another chromatic color, such as red, blue or green, may be used as a back plate 155, a clear image of each color can be formed on a white background. It was confirmed that the thus formed image was not changed after standing for 100 days.

Image erasure is effected by using the halogen heater 160 and the erasure planar heater 158 and by rotating the drive roller 152 in the arrow direction after a desired image display. At this time, the halogen heater 160 is controlled at about 115° C. and the erasure planar heater 158 is controlled at about 95° C. based on the output from the temperature sensors 161. In this way, as for the appearance of the recording medium 151, the entirety of the medium 151 becomes almost transparent when it passes by the halogen heater 160 and is turned into a white scattering state when it passes by the erasure planar heater 158. Thus, by this operation, the above-mentioned display image is entirely erased and the white scattering state is restored. In a specific example, the erasure planar heater 158 had a width of about 40 mm and the entire face thereof was set to a temperature of at least 75° C. or higher.

According to our experiments, the above-mentioned image writing and erasure could be stably repeated at least 200 cycles or more, and clear images were obtained at a moving speed of 40 mm/sec of the medium 151.

This apparatus system can also be effectively operated by using an ordinary serial thermal head instead of the thermal head 153 and by effecting serial scan in the direction vertical to the movement of the medium 151 by using a drive system (not shown).

Further, it is also possible to effect a gradational display by changing the magnitude or duration of a voltage pulse applied to respective dots of the thermal head 153.

In this embodiment, a unitary planar heater 159 is used as a supplemental heating means, but this can be divided so as to locally effect the supplemental heating. It is also possible to use heating means such as a heat roller, a halogen lamp, and a thermal head.

FIGS. 17A–17D show embodiments using heating means other than a planar heater.

Figure 17A:
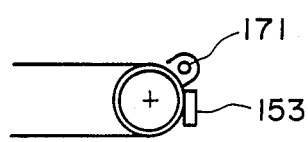
FIGS. 17A through 17D are illustrations of other heating means.

FIG. 17A shows an embodiment of using a halogen lamp 171 as a supplemental heating means. This embodiment is effective in respects of freeness from rubbing of the recording medium 151 and uniform heating because a non-contact heating means is used.

Figure 17B:
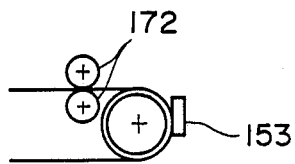

FIG. 17B shows an embodiment of using heat rollers 172, which rotate at a relative speed of zero with respect to the recording medium 151, so that uniform heating can be effected without rubbing as in the case of FIG. 17A.

Figure 17C:
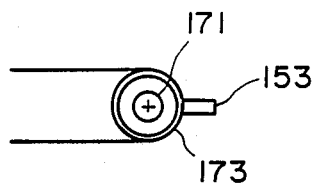

FIG. 17C shows an embodiment of disposing a halogen lamp 171 in a roller 173. In this case, supplemental heating of the recording medium 151 is effected not only in advance of but also simultaneously with image formation by using the thermal head 153, so that a good heat efficiency is attained. Further, it is possible to provide an image of a good contrast.

Figure 17D:
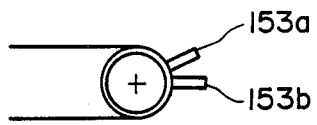

FIG. 17D shows an embodiment of using two thermal heads 153a and 153b, whereby selective supplemental heating can be effected corresponding to an image or locally.

In the respective embodiments, the distance between the thermal head 153 and the supplemental heating means can be arbitrarily selected and adjusted. In this case, it is also possible to control the temperature of the supplemental heating means, e.g., by control of applied voltage or current, similarly as above.

Further, in the above embodiment, a thermal head 153 is used as a writing means. It is however possible to use a laser beam if the recording medium includes a laser beam-absorbing layer.

The above-mentioned polymer liquid crystal has a good heat resistance and film strength, so that it can be used for repetitive image formation while directly rubbing or scanning the polymer liquid crystal layer with a thermal head. In order to increase the strength, however, it is possible to laminate a protective layer of polyimide, aramide resin, etc., on the surface thereof as desired, by pressure-bonding or by the medium of an appropriate adhesive layer.

In a specific example, lamination of a 3.5 micron-thick and 6 micron-thick aramide sheet by pressure-bonding both provided good results in image formation.

EXAMPLE 11

Figure 19:
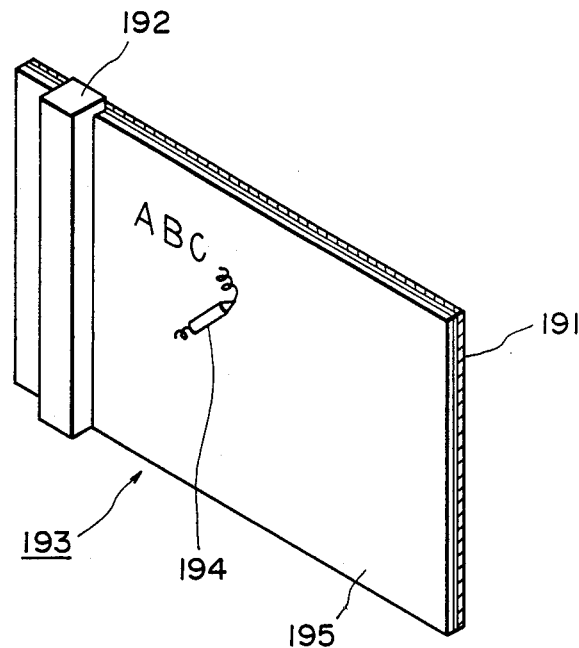
FIG. 19 is a perspective view illustrating another embodiment of the display apparatus according to the present invention.
Figure 20:
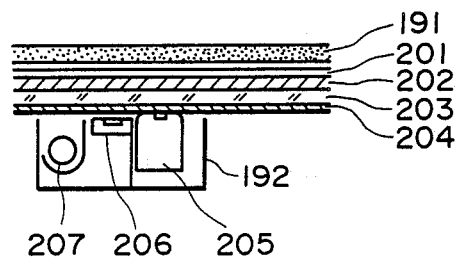
FIG. 20 is a partial sectional view of the apparatus shown in FIG. 19.

FIG. 19 is a schematic perspective view of another display system according to the present invention, wherein a recording medium 195 constituting a display section 193 and a back plate 191 are fixed, and a recording unit 192 as a writing and reading means is moved. FIG. 20 is a partial sectional view of the system.

Referring to FIG. 20, the recording medium 195 comprises a substrate 202 of a transparent resin such as polyethylene terephthalate, glass or ceramics, a polymer liquid crystal layer 203 and a protective layer 204 disposed on one side of the substrate 202, and a planar heat-generating member 201 of indium-tin-oxide, tin oxide, etc., as a supplemental heating means on the other side of the substrate 202. The back plate 191 may be a plate of a black or chromatic color.

The recording unit 192 comprises a thermal head 205 for writing, a readout sensor 206 for reading an image written on the display section 193, and a light source 207 as an erasure means. The recording unit 192 is moved leftwardly and rightwardly by means of a drive motor (not shown). The system can further include a writing pen 194, such as a heat pen or a marker pen as used on an electronic blackboard.

For effecting display by the above system, the polymer liquid crystal layer 203 is supplementary heated to a temperature below Tiso by energizing the planar heat-generating member 201 when the power is turned on or prior to driving of the recording unit 192. In this state, writing is effected by the thermal head 205 or by the writing pen 194.

The recorded image on the display section 193 is read out by the readout sensor 206 and can be stored in an external memory apparatus (not shown). Further, the erasure of the image is effected by heating from the light source 207.

In this way, if the recording medium is provided with a supplemental heating means, it is possible to protect the recording medium and increase the heat efficiency at the time of image formation. Further, the planar heat-generating member 201 can also be used as an erasure means by controlling the heating temperature.

What is claimed is:

1. A recording apparatus, including:
    a recording medium comprising a polymer liquid crystal layer capable of assuming a transparent state or an opaque state;
    first heating means for heating the polymer liquid crystal layer to a temperature below the isotropic transition temperature of the polymer liquid crystal layer; and
    second heating means for heating the polymer liquid crystal layer to a temperature above the isotropic transition temperature, thereby forming a written part therein.

2. A recording apparatus, including:
    a polymer liquid crystal layer capable of assuming a transparent state or an opaque state; and
    means for controlling the liquid crystal proportion in the thickness direction of the polymer liquid crystal layer in accordance with given gradation data to form record portions having at least two optical density levels.

3. An apparatus according to claim 2, wherein the liquid crystal proportion of the polymer liquid crystal is controlled by modulating a light beam applied to the recording layer for writing.

4. An apparatus according to claim 2, wherein the liquid crystal proportion of the polymer liquid crystal is controlled by modulating a heat flux supplied from a thermal head to the recording layer for writing.

5. An apparatus according to claim 4, wherein the heat flux from the thermal head is modulated by controlling a voltage value or a voltage pulse duration applied to the thermal head.

6. An apparatus according to claim 2, wherein said polymer liquid crystal layer has a thickness of 1-100 $\mu$m.

7. An apparatus according to claim 2, wherein said controlling means controls the liquid crystal proportion by heating the polymer liquid crystal above the isotropic transition temperature, then holding the polymer liquid crystal at a temperature below the isotropic transition temperature for a time, and controlling the temperature and the time for holding the polymer liquid crystal.

8. An apparatus according to claim 1, which further comprises third heating means for erasing the written part.

9. A recording apparatus, comprising:
   a recording medium comprising a polymer liquid crystal layer capable of assuming a transparent state or an opaque state;
   first heating means for heating the polymer liquid crystal layer to a temperature in a range from a temperature which is at the mid-point between room temperature and a phase transition temperature for writing, to a temperature which is the lower of a temperature 2-5° C. below the phase transition temperature and a temperature which is lower than the phase transition temperature by 1/10 of the temperature difference between the phase transition temperature and room temperature; and
   second means for heating the polymer liquid crystal layer to a temperature above the phase transition temperature, thereby forming a written part therein.

10. An apparatus according to claim 9, which further comprises third heating means for erasing the written part.

* * * * *

UNITED STATES PATENT AND TRADEMARK OFFICE
CERTIFICATE OF CORRECTION

PATENT NO. : 4,965,591
DATED : October 23, 1990
INVENTOR(S) : YUTAKA KURABAYASHI ET AL.

It is certified that error appears in the above-identified patent and that said Letters Patent is hereby corrected as shown below:

Title page:

AT [54] TITLE

After "RECORDING" (1st occurrence) insert --APPARATUS--.

AT [57] ABSTRACT

Line 4, "phases" should read --phases,--.
Line 6, "transmittance a reflectance," should read
--transmittance or reflectance,--.

COLUMN 1

Line 2, after "RECORDING" (1st occurrence) insert --APPARATUS--.
Line 21, "energy" should read --of energy--.

COLUMN 2

Line 20, "object the" should read --object of the--.

COLUMNS 7-8

Form (22), 

COLUMN 15-16

Form (60), 

COLUMN 17

Line 60, "SmC*→SMA→Iso." should read --SmC*→SmA→Iso.--.

UNITED STATES PATENT AND TRADEMARK OFFICE
CERTIFICATE OF CORRECTION

PATENT NO. : 4,965,591

DATED : October 23, 1990

INVENTOR(S) : YUTAKA KURABAYASHI ET AL.

It is certified that error appears in the above-identified patent and that said Letters Patent is hereby corrected as shown below:

COLUMN 18

Line 34, "to" should read --to be--.

COLUMNS 21-22

Direct Yellow 44, " 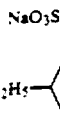 " should read --  --.

COLUMN 31

Line 40, "such a" should read --such as a--.
Line 55, close up right margin.
Line 56, close up left margin.

COLUMN 34

Line 2, "$\overset{\oplus}{N}(C_2H_5)$" should read --$\overset{\oplus}{N}(C_2H_5)_2$--.

COLUMN 35

Line 59, "was" should read --were--.

COLUMN 40

Line 33, "back late 155." should read --back plate 155.--.

UNITED STATES PATENT AND TRADEMARK OFFICE
CERTIFICATE OF CORRECTION

PATENT NO. : 4,965,591
DATED : October 23, 1990
INVENTOR(S) : YUTAKA KURABAYASHI ET AL.

It is certified that error appears in the above-identified patent and that said Letters Patent is hereby corrected as shown below:

COLUMN 42

Line 15, "supplementary" should read --supplementarily--.
    Line 68, "∥m." should read --µm.--.

Signed and Sealed this

Twenty-seventh Day of October, 1992

Attest:

DOUGLAS B. COMER

Attesting Officer      Acting Commissioner of Patents and Trademarks